(12) United States Patent
Quintrell

(10) Patent No.: US 11,781,449 B2
(45) Date of Patent: Oct. 10, 2023

(54) APPARATUS AND METHOD FOR CONTROLLING A GAS STREAM TEMPERATURE OR RATE OF TEMPERATURE CHANGE

(71) Applicant: Electric Power Research Institute, Inc, Palo Alto, CA (US)

(72) Inventor: Merrill Stanton Quintrell, Charlotte, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 16/121,468

(22) Filed: Sep. 4, 2018

(65) Prior Publication Data

US 2020/0072089 A1   Mar. 5, 2020

(51) Int. Cl.
  *F01K 23/10* (2006.01)
  *F02C 7/18* (2006.01)
  *F01D 25/30* (2006.01)

(52) U.S. Cl.
  CPC .......... *F01K 23/101* (2013.01); *F01D 25/305* (2013.01); *F02C 7/18* (2013.01)

(58) Field of Classification Search
  CPC .............. B01F 3/02; B01F 2003/04134; F01K 23/101; F16K 11/00; F16K 11/0743; F24F 1/01; F01D 25/30; F01D 25/305
  USPC .................................................. 454/310, 311
  See application file for complete search history.

(56) References Cited

U.S. PATENT DOCUMENTS

| | | | |
|---|---|---|---|
| 2,418,266 A * | 4/1947 | Kurth | F24F 13/062 454/311 |
| 2,466,851 A * | 4/1949 | Honerkamp | F24F 13/062 454/311 |
| 3,177,923 A * | 4/1965 | Hine, Jr. | F23D 14/105 431/350 |
| 4,000,978 A | 1/1977 | Henrie | |
| 5,269,139 A | 12/1993 | Klees | |
| 5,632,143 A * | 5/1997 | Fisher | F01K 23/10 60/39.181 |
| 5,938,527 A * | 8/1999 | Oshima | F24F 1/01 454/344 |
| 8,166,752 B2 * | 5/2012 | Garcia | F01N 13/082 60/319 |

(Continued)

*Primary Examiner* — Todd E Manahan
*Assistant Examiner* — David P. Olynick
(74) *Attorney, Agent, or Firm* — Owens Law Firm, PC

(57) ABSTRACT

The invention provides various designs of an apparatus and method for attemperating a gas stream temperature. The apparatus of the present invention provides a body through which a gas stream passes that permits, as desired, a second gas, such as gas outside of the gas duct or such as ambient air, to be added to the main gas stream to attemperate the temperature of the main gas stream. The body or device may be referred to as a variable eductor having a plurality of openings through which a second gas may pass into the main gas stream. The openings may be opened or closed, and the variable eductor provides control over which openings and the degree to which each opening is opened. In some designs the variable eductor is inserted between two portions of a gas duct. The variable eductor has widespread application, such as downstream of a gas turbine to attemperate the exhaust gas temperature during startup.

1 Claim, 16 Drawing Sheets

(56) References Cited

U.S. PATENT DOCUMENTS

| | | | |
|---|---|---|---|
| 8,186,152 B2* | 5/2012 | Zhang | F01D 25/30 |
| | | | 60/299 |
| 9,435,228 B2 | 9/2016 | Sieben et al. | |
| 2002/0015930 A1 | 2/2002 | Poe | |
| 2007/0042700 A1 | 2/2007 | Komowski | |
| 2010/0064655 A1 | 3/2010 | Zhang et al. | |
| 2010/0243953 A1 | 9/2010 | Livshits | |
| 2011/0000220 A1* | 1/2011 | Hibshman, II | F01K 23/101 |
| | | | 60/783 |
| 2014/0216001 A1* | 8/2014 | Sieben | F22G 5/12 |
| | | | 60/39.182 |
| 2015/0064637 A1 | 3/2015 | Yu | |
| 2016/0376909 A1 | 12/2016 | Kulkarni et al. | |

\* cited by examiner

APPARATUS AND METHOD FOR CONTROLLING A GAS STREAM TEMPERATURE OR RATE OF TEMPERATURE CHANGE

BACKGROUND OF THE INVENTION

Field of the Invention

The invention in its various embodiments relates generally to an apparatus and method for attemperating or controlling the temperature of a gas stream. In particular, the invention in its various embodiments relates to a variable eductor that provides for the addition of a gas to an existing gas stream to attemperate or control the temperature of the gas stream, such as the temperature of an exhaust gas stream from a gas turbine prior to entering a heat recovery stream generator, for example, during startup.

Description of Related Art

In many industrial applications, gas streams have extremely high temperatures, resulting in thermal stress to infrastructure transporting these gas streams, including, but not limited to, metal pipes, metal casings, and the like. For example, during startup of a gas turbine, exhaust gas temperatures exiting the gas turbine into the heat recovery stream generator (HRSG) may climb to almost 1000° F. in less than two minutes. This temperature rise can result in a significant thermal stress event for the HRSG casing and internals. These steam temperature excursions during startup have also had a negative impact on the piping and steam turbine components. Moreover, the demand for flexible operation has resulted in combined-cycle units being subjected to an unprecedented number of startup cycles that were not anticipated in the original plant design, thus increasing the number of thermal stress events for the HRSG.

Therefore, it is desirable to have a means of controlling the temperature of a gas stream, for example by reducing the temperature of the gas stream, as well as controlling the rate of temperature change of a gas stream. For example, it is desirable to control the temperature and the rate of temperature increase of an exhaust gas stream from a gas turbine during startup and other transient operations or conditions to minimize thermal stress on the downstream HRSG. It is further desirable that such means of temperature control be easy to install and easy to operate, including installation as a retrofit for existing industrial infrastructure. Therefore, there is a need for an apparatus and method for using such an apparatus to control the temperature of a gas stream, for example by reducing the temperature of the gas stream, or to control the rate of temperature change of a gas stream the temperature of a gas stream, or both.

BRIEF SUMMARY OF THE INVENTION

Generally, the invention comprises various embodiments of an apparatus and method for controlling the temperature of or attemperating a gas stream, for example by reducing the temperature of the gas stream or controlling the rate of temperature change of a gas stream, in which the change in temperature may be caused by any number of process conditions or operations, including startup or other transient conditions or operations. As one of skill in the art will appreciate, there are many processes in which controlling a gas temperature or the rate of temperature change of a gas stream would be beneficial. Accordingly, the apparatus and method of the present invention has widespread application.

Generally, the apparatus of the present invention provides various embodiments or designs of a body or device through which a first or main gas stream passes and that permits, as desired, a second gas, such as gas outside of the gas duct or such as ambient air, to be added to the main gas stream to attemperate the temperature of the main gas stream. The body or device, which may be referred to as a variable eductor, is designed to pull gas, such as ambient air, from outside of a gas duct carrying a gas stream into the gas stream. As a result, given a temperature difference between the gas stream in the duct and the second gas pulled into the duct, the variable eductor can be used to adjust the amount of the second gas pulled into the duct to provide the desired temperature control of the gas stream in the duct.

In one embodiment, the present invention provides an apparatus for controlling a temperature of a gas stream, comprising a first body having a first end and a second end and defining a passageway for passing a gas stream having a temperature from the first end to the second end, wherein the body defines at least one opening through which a second gas from outside of the passageway can pass into the passageway; and at least one second body attached to the first body adjacent to the at least one opening that moves between a first position and a second position, wherein the at least one second body closes the at least one opening at the first position and opens the at least one opening at the second position, thereby permitting the second gas to pass through the at least one opening into the passageway to change the temperature of the gas stream.

In some embodiments of the invention, the apparatus has a body having a first end, a second end, and an outer surface defining a duct or passageway configured to permit a gas stream to pass through the body from the first end to the second end. The body has a plurality of openings located in the outer surface of the body and a corresponding plurality of shutters, one for each of the openings. Each of the shutters is movably connected to the outer surface such that each shutter can be opened into the gas duct, thereby creating lower pressure areas behind the shutters within the gas duct and consequently pulling a second gas, such as a gas from outside of a gas duct, through the corresponding opening and into the gas duct and the gas stream passing through the gas duct. It should be appreciated that each of the shutters can be operated independently and can be opened to varying degrees thereby providing control over the flow rate of the second gas through each opening.

In another embodiment, the apparatus has a body that may be a sleeve that connects two ends of two separate gas ducts such that the gas stream passes from the first or upstream gas duct through the sleeve and into the second or downstream gas duct. In this embodiment, the sleeve is disposed around the outside of a gas duct providing the main gas stream and is sized larger than the outer dimensions this gas duct to create a gap or opening between the interior surface of the sleeve and the outer surface of the gas duct through which a second gas can pass into the main gas stream. The sleeve can slide or be moved back and forth along the gas duct. When moved toward the upstream gas duct, the interior of the sleeve creates a gas seal with the upstream gas duct, thereby preventing a second gas from passing into the gas duct. When moved in the opposite direction the gas seal is removed thereby permitting the second gas to pass through the opening and into the gas stream.

In another embodiment, the apparatus may be similar to the sleeve described above but instead the sleeve rotates about the gas ducts. In this case, a plate having a plurality of openings may be attached to the upstream gas duct and disposed at the entrance to the gap or opening created between the interior surface of the sleeve and the outer surface of the upstream gas duct. A similarly dimensioned plate with a plurality of openings is attached to the sleeve and positioned adjacent to the plate attached to the outer surface of the upstream gas duct. The openings on both plates are positioned such that when the sleeve rotates, the plate attached to the sleeve will similarly rotate adjacent to the plate attached to the outer surface of the upstream gas duct. Depending upon the degree of rotation, the corresponding openings on both plates may partially or completely align such that the openings are partially or completely open. Accordingly, the sleeve can be rotated to permit a certain amount of the second gas to pass through the openings between the interior surface of the sleeve and the outer surface of the upstream gas duct, through a gap between the sleeve and the outer surface of the upstream gas duct, into the gas stream passing through the sleeve, and ultimately into the downstream gas duct.

In another embodiment, the apparatus may also be a sleeve having an attached plate or surface with a plurality of openings positioned radially around the plate as described above in connection with the sleeve that rotates; however, in this embodiment, the sleeve is stationary during use. In this embodiment, shutters, similar to those described above, are used in connection with the openings in the plate and are controlled in a similar fashion to open, thereby permitting a second gas to be added to the gas stream passing through the gas duct. Also, similarly, it should be appreciated that each of the shutters can be operated independently and can be opened to varying degrees thereby providing control over the flow rate of the second gas through each opening.

As described above, the apparatus of the invention can be used in a method to control the temperature of a gas stream or to control the rate of temperature change of a gas stream, either of which has widespread application. For example, in one embodiment, it is desirable to control the temperature or the rate of temperature increase, or both, of an exhaust gas stream from a gas turbine during startup and other transient operations or conditions to minimize thermal stress on a downstream heat recovery steam generator (HRSG).

In some embodiment, the present invention provides a method for controlling a temperature of a gas stream, comprising passing a gas stream having a first gas temperature through a gas duct, wherein a portion of the gas duct comprises a first body having a first end and a second end and defining a passageway for passing the gas stream from the first end to the second end, wherein the body defines at least one opening, and at least one second body attached to said first body adjacent to the at least one opening to open and close the at least one opening; moving the second body to open the at least one opening, thereby creating a gas pressure lower than a gas pressure of a gas outside of said passageway, wherein the gas outside of the passageway has a second gas temperature different from the first gas temperature, and pulling the gas outside of said passageway into the passageway and into the gas stream, thereby changing the temperature of the gas stream.

DETAILED DESCRIPTION OF THE INVENTION

Figure 1:
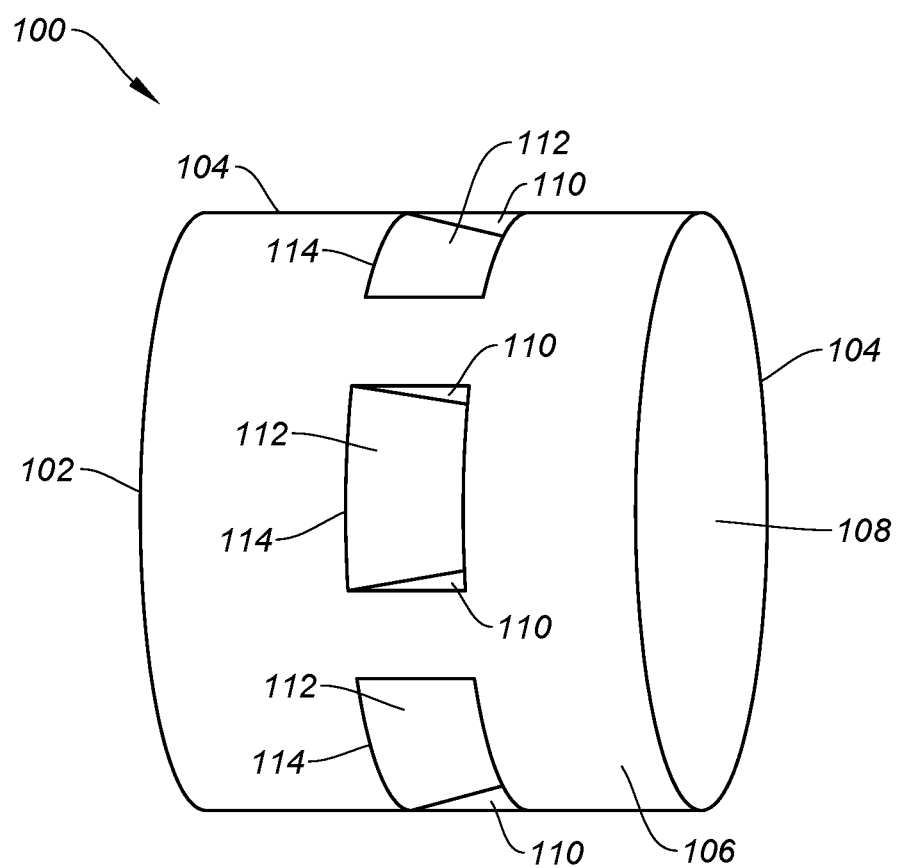
FIG. 1 illustrates a perspective side view of an apparatus for controlling a temperature of a gas stream according to one embodiment of the present invention.

The present invention is more fully described below with reference to the accompanying Figures. While the invention will be described in conjunction with particular embodiments, it should be understood that the invention includes alternatives, modifications, and equivalents. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

Generally, the invention comprises various embodiments of an apparatus and method for controlling the temperature of or attemperating a gas stream, for example by reducing the temperature of the gas stream or controlling the rate of temperature change of a gas stream, in which the change in temperature may be caused by any number of process conditions or operations, including startup or other transient conditions or operations. As one of skill in the art will appreciate, there are many processes in which controlling a gas temperature or the rate of temperature change of a gas stream would be beneficial. Accordingly, the apparatus and method of the present invention has widespread application.

Generally, the apparatus of the present invention provides various embodiments or designs of a body or device through which a first or main gas stream passes and that permits, as desired, a second gas, such as gas outside of the gas duct or such as ambient air, to be added to the main gas stream to attemperate the temperature of the main gas stream. The body or device, which may be referred to as a variable eductor, is designed to pull gas, such as ambient air, from outside of a gas duct carrying a gas stream into the gas stream. In some embodiments, the variable eductor is used to create a pressure differential between a main gas stream flowing through a duct and a second gas, such as a gas surrounding the outside of the duct, to effect pulling the second gas into the gas stream flowing through the duct. In some embodiments, the variable eductor is used to take advantage of the velocity of the gas stream in the gas duct to pull a second gas, such as a gas surrounding the outside of the duct, into the gas stream. Accordingly, the variable eductor takes advantage of the velocity and lower pressure of the gas stream passing through the duct. In addition, the variable eductor is designed to provide control over the amount of the second gas that is pulled into the duct. As a result, given a temperature difference between the gas stream in the duct and the second gas pulled into the duct, the variable eductor can be used to adjust the amount of the second gas pulled into the duct to provide the desired temperature control of the gas stream in the duct. It should be appreciated that the apparatus of the present invention is more than an educator in that it also allows for the control or attemperation of the temperature of the gas stream flowing through the gas duct through the control of the amount of the second gas being pulled into the gas duct and into the gas stream. In some embodiments, this can be accomplished using ambient or atmospheric air as the second gas without the need for complex equipment and with little to no increase in unit auxiliary load or additional required power requirements. In some embodiments, the variable eductor can be installed inline in a gas duct or retrofit into an existing gas duct.

It should be appreciated that the variable eductor may be designed in various ways, some of which are described below, to accomplish the same purpose of pulling a certain amount of a second gas, such as a gas from outside of a gas duct, into the gas duct to control the temperature of the gas stream in the gas duct or to control the rate of temperature change of the gas stream in gas duct, or both. In some embodiments of the invention, the apparatus has a body having a first end, a second end, and an outer surface defining a duct or passageway configured to permit a gas stream to pass through the body from the first end to the second end. The body has a plurality of openings located in the outer surface of the body and a corresponding plurality of shutters, one for each of the openings. Each of the shutters is movably connected to the outer surface such that each shutter can be opened into the gas duct, thereby creating lower pressure areas behind the shutters within the gas duct and consequently pulling a second gas, such as a gas from outside of a gas duct, through the corresponding opening and into the gas duct and the gas stream passing through the gas duct. It should be appreciated that each of the shutters can be operated independently and can be opened to varying degrees thereby providing control over the flow rate of the second gas through each opening. It should be appreciated that this ability to independently control each of the shutters allows for the asymmetrical introduction of the second gas into the main gas stream, thereby providing control over the distribution or direction of flow of the second gas into the main gas stream and the ability to effect mixing with the main gas stream and the direction of flow of the main gas stream. For example, controlling which shutters are opened and closed and to which degree allows for the introduction of the second gas into the main gas stream to vector the flow of the main gas stream upwards, downwards, or even laterally, with the main gas duct. It should also be appreciated that the orientation and shape of the openings and shutters may be used to control the direction of flow of the second gas into the main gas stream, thereby effecting mixing and control over the direction of flow of the main gas stream. Each of the shutters can also be closed, thereby preventing the second gas from passing through the corresponding openings and into the gas duct and gas stream. In this manner of opening and closing the shutters, the apparatus allows a controlled amount of the second gas to be added to the gas stream passing through the gas duct. By using a second gas having a different temperature, the temperature of the gas stream in the gas duct can be controlled based upon the flow rate of the second gas. It should be appreciated that in some embodiments, the orientation of the shutters or the corresponding openings may be designed to provide a certain direction of gas flow into the gas duct, such as having the second gas flow straight into the gas duct or in a parallel direction to the gas flow of the gas stream in the gas duct or having the gas flow at an angle into the gas duct thus creating a spiral flow of the gas being pulled into the gas duct.

In another embodiment, the apparatus has a body that may be a sleeve that connects two ends of two separate gas ducts such that the gas stream passes from the first or upstream gas duct through the sleeve and into the second or downstream gas duct. In this embodiment, the sleeve is disposed around the outside of a gas duct providing the main gas stream and overlaps that gas duct by a given length. In particular, the upstream end of the sleeve is sized larger than the outer dimensions of the upstream gas duct to create a gap or opening between the interior surface of the sleeve and the outer surface of the upstream gas duct through which a second gas can pass into the main gas stream. At the opposite end, the sleeve fits within the downstream gas duct at which point a gas seal is provided between the sleeve and the downstream gas duct. The sleeve can slide or be moved back and forth along the direction of gas flow or along the length of the upstream or downstream gas ducts by a given amount. When moved toward the upstream gas duct, the interior of the sleeve creates a gas seal with the upstream gas duct, thereby sealing the gap between the interior surface of the sleeve and the outer surface of the upstream gas duct and preventing a second gas, such as a gas from passing outside of the gas duct, into the gas duct. This gas seal can be created by an interior funnel portion within the sleeve that is attached to the interior surface of the sleeve and that traverses the opening or gap between the sleeve and the upstream gas duct and seals against the end of the upstream gas duct or its outer surface near the end of the gas duct. When moved in the opposite direction along the length of the gas ducts toward the downstream gas duct, the funnel portion of the sleeve is separated from or moved away from the end of the upstream gas duct thereby removing the gas seal and permitting the second gas to pass through the opening or gap between the interior surface of the sleeve and the outer surface of the upstream gas duct and into the gas stream passing through the sleeve and ultimately the downstream gas duct. In either position, however, a gas seal is maintained between the sleeve and the downstream gas duct, which may be created through the use of any means known in the art for creating a gas seal between the sleeve and the downstream gas duct, while allowing the sleeve to move back and forth along the downstream gas duct.

In another embodiment, the apparatus may be similar to the sleeve described above but instead of the sleeve moving back and forth along the gas ducts, the sleeve rotates about the gas ducts. In this case, a plate or surface having a plurality of openings may be disposed at the entrance to the gap or opening created between the interior surface of the sleeve and the outer surface of the upstream gas duct such that it traverses the gap or opening. This plate may be attached to the outer surface of the upstream gas duct such that it is stationary during use. A similarly dimensioned plate or surface with a plurality of openings is attached to the sleeve and positioned adjacent to the plate attached to the outer surface of the upstream gas duct such that it also traverses the gap or opening. The plate may be attached to the sleeve such that it is adjacent either on the inside or outside of plate attached to the outer surface of the upstream gas duct. The openings on both plates are positioned such that when the sleeve rotates, the plate attached to the sleeve will similarly rotate adjacent to the plate attached to the outer surface of the upstream gas duct. Depending upon the degree of rotation, the corresponding openings on both plates may partially or completely align such that the openings are partially or completely open. Correspondingly, the sleeve can be rotated such that the plate attached to the sleeve partially obstructs or completely blocks the openings on the plate attached to the outer surface of the upstream gas duct. Accordingly, the sleeve can be rotated to permit a certain amount of the second gas to pass through the openings between the interior surface of the sleeve and the outer surface of the upstream gas duct, through a gap between the sleeve and the outer surface of the upstream gas duct, into the gas stream passing through the sleeve, and ultimately into the downstream gas duct. A gas seal is maintained between the sleeve and the downstream gas duct, which may be created through the use of any means known in the art for creating a gas seal between the sleeve and the downstream gas duct, while allowing the sleeve to rotate.

In another embodiment, the apparatus may also be a sleeve having an attached plate or surface with a plurality of openings positioned radially around the plate as described above in connection with the sleeve that rotates; however, in this embodiment, the sleeve is stationary during use. In this embodiment, shutters, similar to those described above, are used in connection with the openings in the plate and are controlled in a similar fashion to open, thereby permitting a second gas to be added to the gas stream passing through the gas duct. Also, similarly, it should be appreciated that each of the shutters can be operated independently and can be opened to varying degrees thereby providing control over the flow rate of the second gas through each opening. Also, as described above, this ability to independently control each of the shutters allows for the asymmetrical introduction of the second gas into the main gas stream, thereby providing control over the distribution or direction of flow of the second gas into the main gas stream and the ability to effect mixing with the main gas stream and the direction of flow of the main gas stream. Similarly, the orientation and shape of the openings and the shutters may also be used to effect the direction of flow of the second gas into the main gas stream.

As described above, the apparatus of the invention can be used in a method to control the temperature of a gas stream or to control the rate of temperature change of a gas stream, either of which has widespread application. For example, in one embodiment, it is desirable to control the temperature or the rate of temperature increase, or both, of an exhaust gas stream from a gas turbine during startup and other transient operations or conditions to minimize thermal stress on a downstream heat recovery steam generator (HRSG). During startup of a gas turbine in a combined cycle process, the exhaust gas temperature may climb to almost 1000° F. in less than two minutes. This magnitude of temperature rise can result in a significant thermal stress event for the HRSG, including its casing and internal components and related piping. Similarly, temperature rises may be experienced during transient operations or conditions. In these cases, the apparatus of the present invention may be used to add a second gas having a lower temperature, such as ambient air, to the exhaust gas from the gas turbine, thereby reducing the temperature of the exhaust gas and reducing or minimizing the otherwise significant temperature rise or spike experienced by the HRSG. Specifically, a user may operate one of the various designs for the variable eductor to permit a certain amount of a second gas, such as gas from outside of the gas duct carrying the gas stream having a temperature to be controlled, to be added to the gas stream. For example, a user may open at least one or more of the shutters to allow a second gas to pass through the corresponding openings in the outer surface of the body of the apparatus of the present invention and into the gas stream passing concurrently through the apparatus of the present invention. Alternatively, a user may move a sleeve that connects two gas duct and that is disposed around the two gas ducts along the direction of gas flow through the gas ducts to allow a second gas to pass through the gap between the sleeve and the upstream gas duct and into the gas stream. Alternatively, a user may rotate a sleeve that connects two gas ducts and that is disposed around the two gas ducts to partially or completely align a plurality of openings in two adjacent plates or surfaces to allow a second gas to pass through the openings and between the sleeve and the upstream gas duct and into the gas stream. Particularly in the context of a gas turbine, because the gas velocities of the exhaust gas through the gas duct are relatively high, and with the relatively low pressure, eductor efficiency would be quite good, thereby relatively easily drawing in ambient atmospheric air to attemperate the exhaust gases entering the HRSG in a controlled fashion. Given the significant temperature difference between the gas turbine exhaust gas temperature and that of the ambient air, relatively small amounts of ambient air may have a considerable attemperating influence.

It should also be appreciated that in some embodiments, control over a rate of temperature increase in a gas stream, due to an upstream process condition or operation, may also be provided by the apparatus of the present invention. For example, again, during startup of a gas turbine in a combined cycle process, the exhaust gas temperature may climb to almost 1000° F. in less than two minutes. By using the apparatus of the present invention, this rate of temperature changed can also be controlled, as opposed to using the apparatus to achieve a particular temperature set point. In other words, as the temperature in the gas stream (e.g., the exhaust gas stream from the gas turbine) begins to quickly rise, the apparatus of the invention can be operated to control the rate at which that temperature increases, again, as opposed to controlling the apparatus to achieve a particular temperature setpoint. In this manner, the effect of a sudden temperature increase on downstream equipment can be reduced or minimized, regardless of the actual temperature itself.

Following, various embodiments and other features of the apparatus of the present invention are described in more detail in connection with the Figures. Also, the following describes various methods for using the apparatus of the present invention, including, for example, control methods for the apparatus.

FIG. 1 illustrates a perspective side view of an apparatus for controlling a temperature of a gas stream according to one embodiment of the present invention. As depicted, the apparatus 100 comprises a body 101 having a first end 102, a second end 104, and an outer surface 106. The body 101 is roughly cylindrical in shape and is configured to permit a gas stream to pass through a gas duct or passageway 108 defined by the body 101 from the first end 102 to the second end 104. It should be appreciated that the gas stream may be any gas stream whose temperature or rate of temperature increase is to be controlled, including gas streams in industrial applications, such as an exhaust gas stream from a gas turbine, including a gas turbine whose exhaust gas stream feeds an HRSG.

Additionally, the body 101 comprises a plurality of openings 110 distributed along the outer surface 106 of the body 101. The body 101 further comprises a plurality of shutters 112 distributed along, and movably connected to, the outer surface 106. Each of the plurality of shutters 112 is adjacent to, and associated with, a corresponding opening 110. In the view of the apparatus depicted in FIG. 1, there are three openings 110 visible. Each opening 110 has a corresponding shutter 112 with which it is associated. Additionally, each opening 110, as well as each shutter 112, is roughly rectangular in shape. It should be appreciated that there may be one or more additional openings 110 and shutters 112 distributed along the outer surface 106 of the body 101 that are not visible in the side view depicted in FIG. 1. Thus, it should be appreciated that there may be any number of openings 110, including five, six, seven, eight, nine, or 10 or more openings 110, and corresponding shutters 112, distributed along the outer surface 106 of the body 101, depending on the exact dimensions of each opening 110 and each shutter 112. It should be appreciated that depending upon the degree of attemperation desired by use of the apparatus of the present invention, the size and number of the openings 110 can be adjusted appropriately.

It should be appreciated that in some embodiments, the openings 110 are distributed evenly in a radial direction around the circumference of the body 101. The openings 110 may also be distributed such that there are two circles of opening 110 around the circumference of the body 101. It should be appreciated that the openings 110 are defined by edges in the outer surface 106 of the body 101 and that the edges may define any planar geometric shape, such as a polygon, including, for example, a square or rectangle. It should also be appreciated that the corresponding shutter 112 may have the same geometric circumference as the corresponding opening 110. Each shutter 112 in some embodiments may be a flat plate. The body 101 of the apparatus, including each of the plurality of shutters, may be constructed of any suitable material known to one of skill in the art, including metal or metal alloys.

Each of the plurality of shutters 112 is configured to open relative to the outer surface 106 of the body 101, thereby permitting a second gas, such as ambient air, to pass from outside of the body 101 through the corresponding opening 110 and into the gas duct 108. FIG. 1 illustrates the shutters 112 as being open, which would permit a second gas to pass from the outside of the body 101 through each corresponding opening 110 and into the gas duct 108. Similarly, each of the plurality of shutters 112 is configured to close relative to the outer surface 106 of the body 101, thereby preventing the second gas from passing from the outside of the body 101 through the corresponding opening 112 and into the gas duct 108. Accordingly, the plurality of shutters 112 are also configured when in a closed position to prevent the gas stream within the gas duct 108 from leaking or escaping from the gas duct 108.

It should be appreciated that attachment of the shutters 112 to the body 101 may be accomplished using any mechanical connector 114 that movably connects the shutter 112 to the body 101 and that permits the shutter 112 to open and close. In some embodiments, each of the shutters 112 may be connected using a hinge or hinge-like mechanism. It should be appreciated that one side of the shutter 112 is connected to one of the edges of the outer surface 106 of the body 101 that defines the corresponding opening 110. As shown in FIG. 1, each of the openings 110 are defined by edges in the shape of a polygon, such as a rectangle. In one embodiment, each of the shutters 112 is attached to a corresponding edge of the opening 112 that is upstream of the other or remaining edges of the opening 112 relative to the direction of gas flow through the gas duct 108. With respect to FIG. 1, the gas flow through the gas duct 108 is from the first end 102 to the second end 104 of the body 101 or from left to right. Accordingly, the mechanical connector 114, such as a hinge, is located on the left-most edge of the opening 112. In this case, the shutter 112 would rotate about the hinge 114 and when opened would move inward and into the gas duct 108, thereby protruding into the gas duct 108. In this manner, the shutter 112 creates a low pressure area on the backside or upstream side of the shutter 112 inside of the gas duct 108, thereby providing a driving force for pulling the second gas, such as ambient air through the opening 110, such that the second gas passes over the downstream side of the shutter 112 inside of the gas duct 108 and into the gas duct 108.

Figure 2:
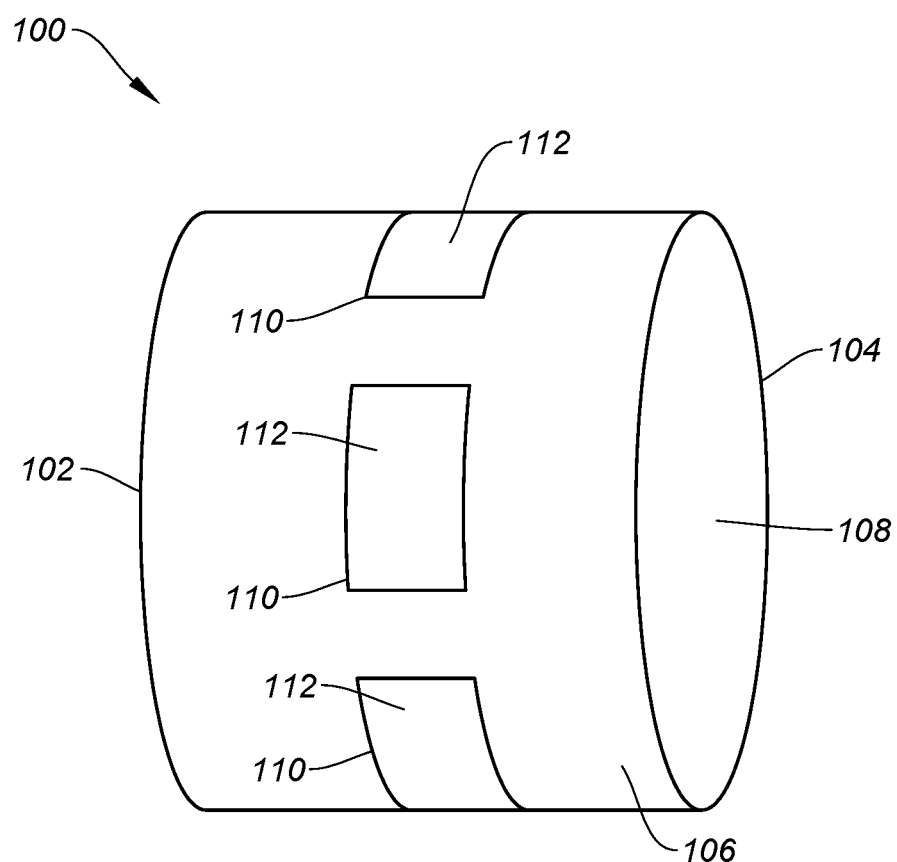
FIG. 2 illustrates the same perspective side view of the apparatus of FIG. 1 with the shutters in a closed position according to one embodiment of the present invention.

FIG. 2 illustrates the same perspective side view of the apparatus of FIG. 1 with the shutters in a closed position according to one embodiment of the present invention. As depicted, the shutters 112 are distributed along the outer surface 106 of the body 101 corresponding to each opening 110 as shown in FIG. 1. As depicted in FIG. 2, each of the three visible shutters 112 is closed relative to its corresponding opening 110. It should be appreciated that when any shutter 112 is closed relative to its corresponding opening 110 it may be substantially flush with the outer surface 106. As a result, the gas stream passing through the duct 108, as well as the second gas outside of the body 101 or adjacent to the outer surface 106, is substantially unable to traverse or pass through a given opening 110.

Figure 3:
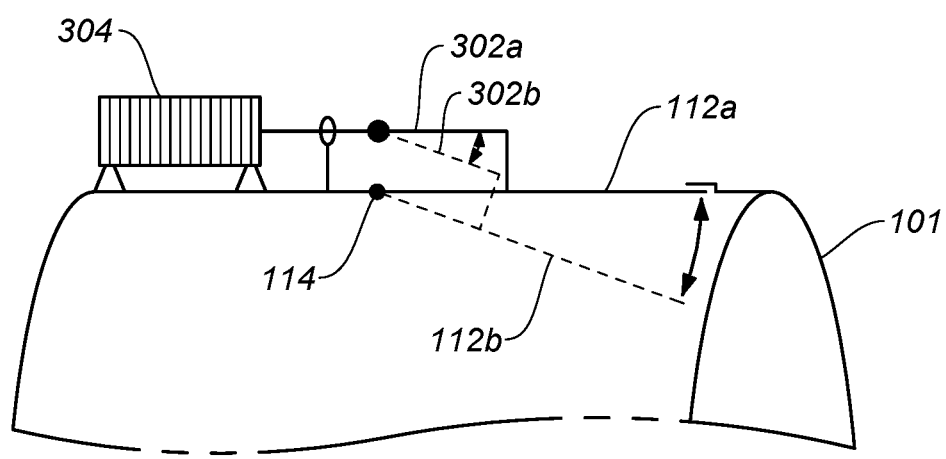
FIG. 3 illustrates a side view of equipment for operating the shutters according to one embodiment of the present invention.

FIG. 3 illustrates a side view of equipment for operating the shutters according to one embodiment of the present invention. As depicted, a shutter in a closed position 112a can be attached to the body 101 using any mechanical connector 114, such as a hinge, that permits the shutter to open and close. The shutter in an open position 112b results from the rotation of one end of the shutter 112 about the axis of a hinge 114. The shutter 112 is attached to one end of a linkage 302 that is connected to an actuator 304 at its other end. The actuator 304 can then be controlled by an electrical control signal that causes the actuator 304 to move the linkage 302, thereby moving the shutter 112 between a closed position 112a and an open position 112b.

It should be appreciated that the actuator 304 may also be controlled to effect opening the shutter to any position between those of being completely closed 112a and completely open 112b. In this manner, the shutter can be opened to varying amounts or degrees, thereby providing a smaller or larger effective opening through which the second gas may pass into the gas duct 108. Accordingly, opening the shutter to any position between fully opened or completely closed provides precision over the amount of the second gas that is permitted to pass through the corresponding opening 110 into the gas duct 108, thereby providing more control over the degree of attemperation of the gas stream being fed to the apparatus of the present invention and into the gas duct 108. Specifically, each of the plurality of varying degrees of opening may be associated with a specific flow rate of the second gas into the gas duct 108. One of skill in the art will appreciate that different flow rates of the second gas into the gas duct 108 may be determined based, at least in part, on the dimensions of the opening formed between each of the plurality of corresponding openings 110 and each of the plurality of shutters through which the second gas may pass and the pressure drop across the opening through which the second gas may pass. Accordingly, the degree to which the shutters are opened can be determined. It should be appreciated that in some embodiments, however, the shutters may only be operated to be completely closed or completely opened.

It should be appreciated that one or more control systems may be utilized to adjust the opening and closing of the shutters. In some embodiments, the control system enables simultaneous, or near-simultaneous, opening and closing of all of the shutters. It should also be appreciated that the control system may be used to open and close each shutter separately and to control the degree to which each shutter is separately opened. Accordingly, it should be appreciated that each of the shutters can be operated independently and can be opened to varying degrees thereby providing control over the flow rate of the second gas through each opening. It should be appreciated that this ability to independently control each of the shutters allows for the asymmetrical introduction of the second gas into the main gas stream, thereby providing control over the distribution or direction of flow of the second gas into the main gas stream and the ability to effect mixing with the main gas stream and the direction of flow of the main gas stream. For example, controlling which shutters are opened and closed and to which degree allows for the introduction of the second gas into the main gas stream to vector the flow of the main gas stream upwards, downwards, or even laterally, with the main gas duct.

In use, the apparatus of the present invention in its various embodiments provides the ability to control the temperature of a gas stream that passes through the apparatus or to control the rate of any temperature change experienced by the gas stream. The apparatus of the present invention can be installed in an existing gas duct or incorporated into a new gas duct design in which a user desires to attemperate the temperature of a gas stream that passes though the gas duct. During operation, the gas stream to be attemperated passes through the gas duct, including that portion of the gas duct provided by the apparatus of the present invention, such as the gas duct 108 provided by the body 101 of the embodiment shown in FIG. 1. Upon experiencing a need to attemperate the temperature of the gas stream, such as during startup of a gas turbine or any transient operation where the exhaust gas from the gas turbine is the gas stream to be attemperated, at least one of the plurality of shutters can be opened to a desired degree of opening, thereby permitting a predefined flow rate of a second gas, such as ambient air, to pass through an opening in the body of the apparatus of the present invention and into the gas duct. Without being limited by theory, the apparatus of the present invention provides a variable eductor. Accordingly, the velocity of the gas stream passing through the gas duct acts to pull in the second gas stream from outside of the apparatus' body or outer surface, thereby adding the second gas to the gas stream passing through the gas duct. Therefore, it should be appreciated that the higher the velocity of the gas in the gas duct can accommodate higher pressures of the second gas outside of the gas duct. Given a temperature difference between the two gas streams and their relative mass flow rates, this provides the ability to control the temperature of the gas stream as its exits the apparatus of the present invention of the gas stream or the rate of temperature increase being experienced by the gas stream as its exits the apparatus of the present invention. Therefore, the apparatus of the present invention is more than an educator in that it also allows for the control or attemperation of the temperature of the primary gas stream through the controlled use of the plurality of shutters, which can be opened to varying degrees to control the amount of the second gas being pulled into the duct and primary gas stream and thereby control the temperature of the primary gas stream exiting the apparatus.

The addition of this second gas to the gas stream in the gas duct, based upon a temperature difference between the second gas stream and the gas stream in the gas duct, results in controlling the temperature of the gas stream in the gas duct or controlling the rate of temperature change, such as a rapid increase in temperature, in the gas stream in the gas duct. In some embodiments, it should be appreciate that the second gas may have a lower temperature than that of the first gas stream. Purely as a non-limiting example, in the case of a gas turbine, the second gas may have a temperature that is approximately 1000° F. lower, or more, than the temperature of the gas stream entering that portion of the gas duct provided by the apparatus of the present invention. Accordingly, in one embodiment, the apparatus of the present invention may utilize atmospheric air as the second gas to reduce the temperature of an exhaust gas stream from a gas turbine, particularly during startup or during a transient operation or condition in which the temperature of the exhaust gas stream increases rapidly.

It should be appreciated that the degree to which the shutters may be open may be adjusted over time depending upon the attemperation required for the gas stream passing through the gas duct. In some embodiments, such adjustments may include fully opening all of the shutters upon an initial change in the temperature of the gas stream and varying the degree of opening, such as slowly closing the shutters over time, to a point where the shutters would be completely closed once the reason for the temperature change of the gas stream has abated. For example, during startup of a gas turbine, the shutters may be fully opened, and as the gas turbine approaches steady-state and the exhaust temperature begins to stabilized, the shutters may be slowly closed during this period until the point at which the gas turbine and the exhaust gas temperature are at steady-state, at which time the shutters would be fully closed. In some embodiments, the adjustment of the degree to which the shutters are opened may be simply fully opening or fully closing a given subset of shutters.

In certain aspects of the invention, it should be appreciated that the rate at which the plurality of shutters can be controlled as well. Purely as a non-limiting example, a user may control the rate of opening of at least one of the plurality of shutters in order to achieve a specific flow rate of the second gas into the body, thereby achieving a desired reduction in the first gas temperature of the first gas stream.

It should be appreciated that control of the plurality of shutters, including opening and closing, which shutters to open and close, the degree to which the shutters are opened, and the rate of opening, may all be controlled. Data may be collected that is used for such control over the shutters. For example, gas stream temperatures, both upstream and downstream of the apparatus of the present invention, and the temperature of the second gas stream (e.g., the ambient air temperature) may be used in a control system, such as a feedback or feedforward control system, to control the shutters. Other data such as gas stream flow rate and pressure may also be monitored and used to control the shutters. Such monitoring may be achieved by any temperature monitoring devices including, but not limited to, temperature sensors, thermocouples, and the like.

Figure 4:
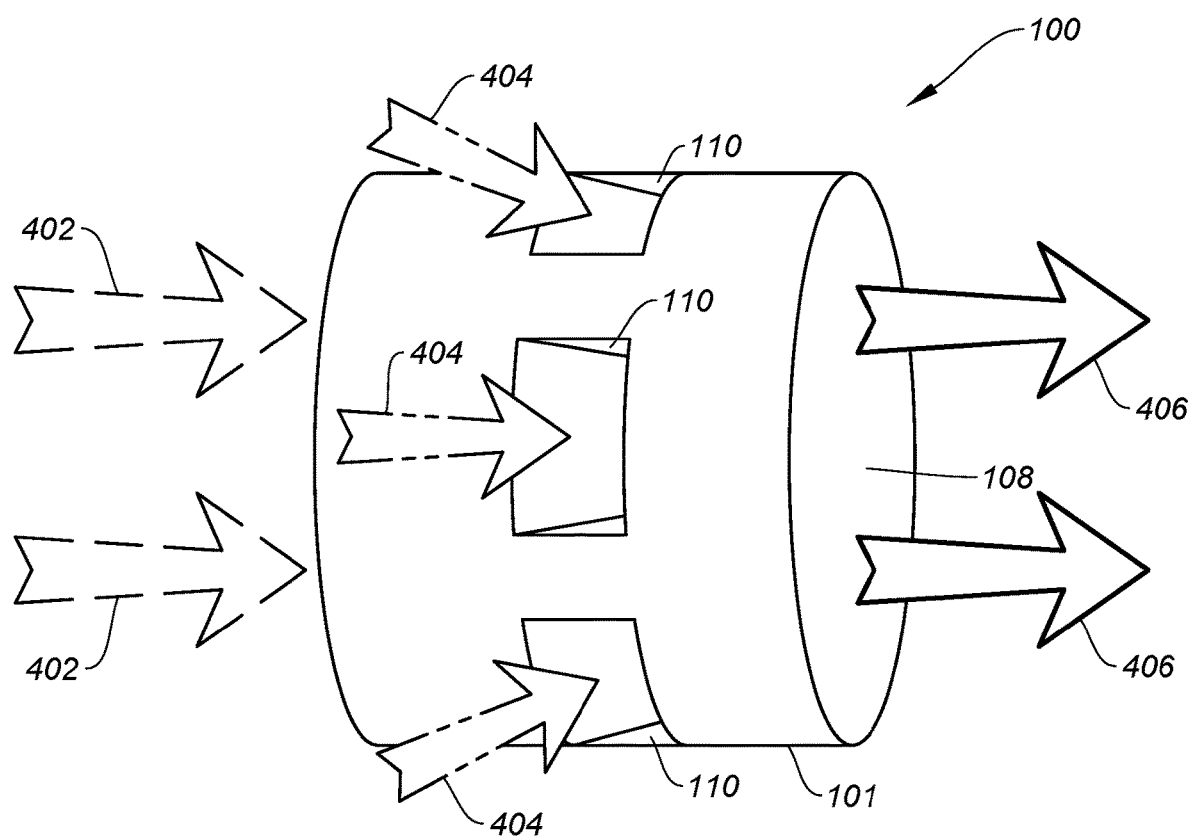
FIG. 4 illustrates the gas flow through the apparatus of FIG. 1 during operation according to one embodiment of the present invention.

FIG. 4 illustrates the gas flow through the apparatus of FIG. 1 during operation according to one embodiment of the present invention. As depicted, the gas stream 402 entering the apparatus 100 of the present invention passes into the gas duct 108 provided by the body 101 of the apparatus 100. In this embodiment, the shutters 112 are in an open position such that a second gas stream 404 passes through the openings 110 and is combined with the gas stream 402 entering the gas duct 108. The combined gas streams 406 then exit the gas duct 108 provided by the body 101 of the apparatus 100.

Figure 5:
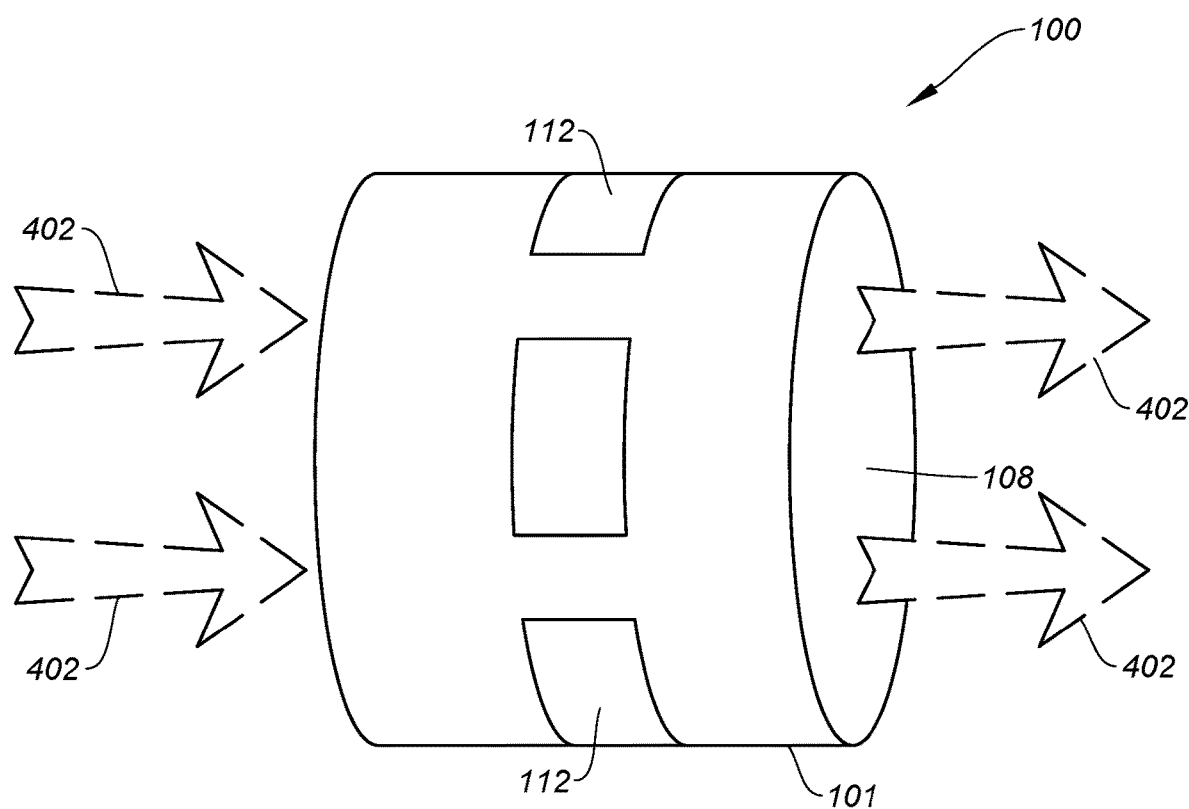
FIG. 5 illustrates the gas flow through the apparatus of FIG. 1 during operation according to another embodiment of the present invention.

FIG. 5 illustrates the gas flow through the apparatus of FIG. 1 during operation according to another embodiment of the present invention. As depicted, the gas stream 402 entering the apparatus 100 of the present invention passes into the gas duct 108 provided by the body 101 of the apparatus 100. In this embodiment, the shutters 112 are in a closed position such that a second gas stream 404 cannot be pulled through the corresponding openings (not shown as the openings are covered by the closed shutters 112) or combined with the gas stream 402 entering the gas duct 108. The gas streams 402 then exits the gas duct 108 provided by the body 101 of the apparatus 100 unaffected by the apparatus 100 of the present invention.

Figure 6:
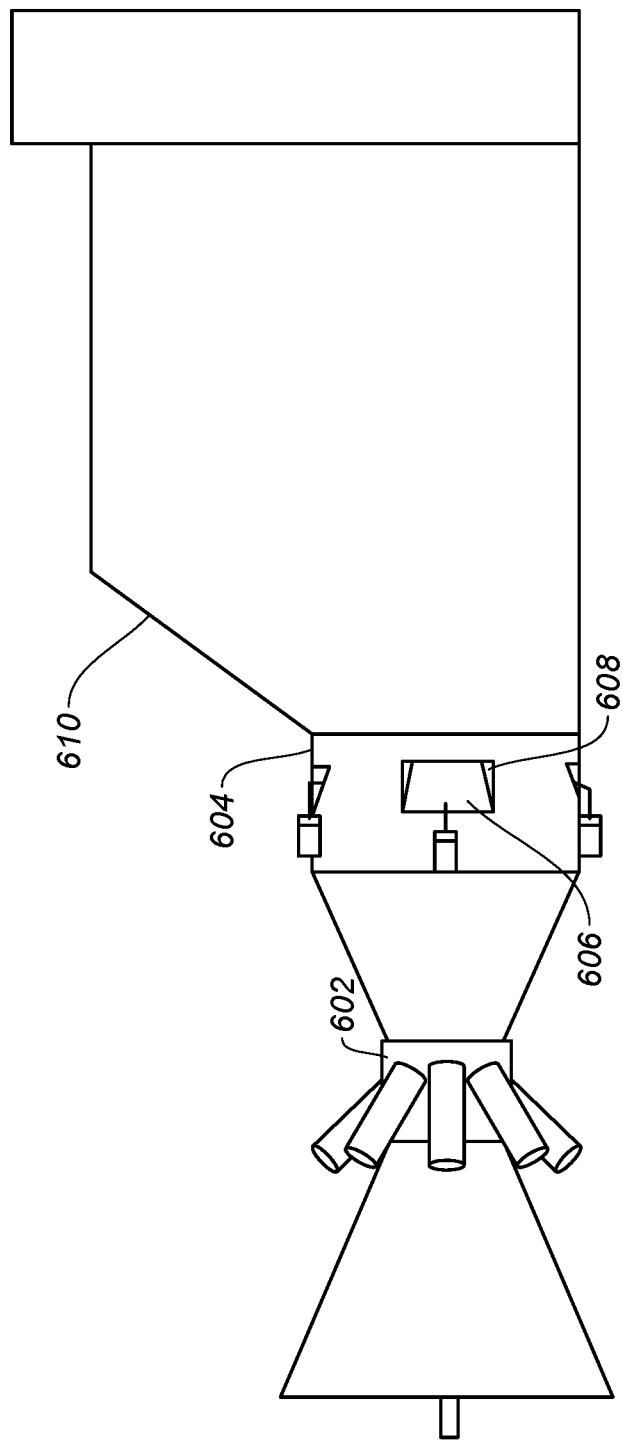
FIG. 6 illustrates the use of the present invention in conjunction with a gas turbine and a heat recovery steam generator (HRSG)

FIG. 6 illustrates the use of the present invention in conjunction with a gas turbine and a heat recovery steam generator (HRSG). As depicted, a gas turbine 602 produces an exhaust gas stream that is passed through the apparatus of the present invention 604, such as the embodiment described in connection with FIG. 1. In FIG. 6, three shutters 606 and three corresponding openings 608 are illustrated, although it should be appreciated that additional shutters and openings may be included in the design of the apparatus 604. After passing through the apparatus 604, the gas stream is fed to the HRSG 610. During operation, the exhaust gas stream may have a temperature of up to approximately 1000-1300° F., which during a cold start may be reached within a few minutes of startup of the gas turbine 602. Accordingly, the shutters 606 would be operated to allow ambient air to enter the duct through which the exhaust gas stream passes to attemperate the temperature of that gas stream. In some embodiments, the temperature of the exhaust gas stream can be monitored to allow a control system to modulate the degree of attemperation, for example, by controlling the number of shutters being opened and the degree to which they are opened. In this manner, the temperature of the exhaust gas stream, as well as the rate of temperature change, can be controlled to slowly increase the gas temperature to which the HRSG 610 is exposed, particularly during a cold start when a larger degree of attemperation would be required compared to controlled process operation of the gas turbine and taking into account the materials of construction of the HRST 610 exposed to the exhaust gas temperature.

Figure 7:
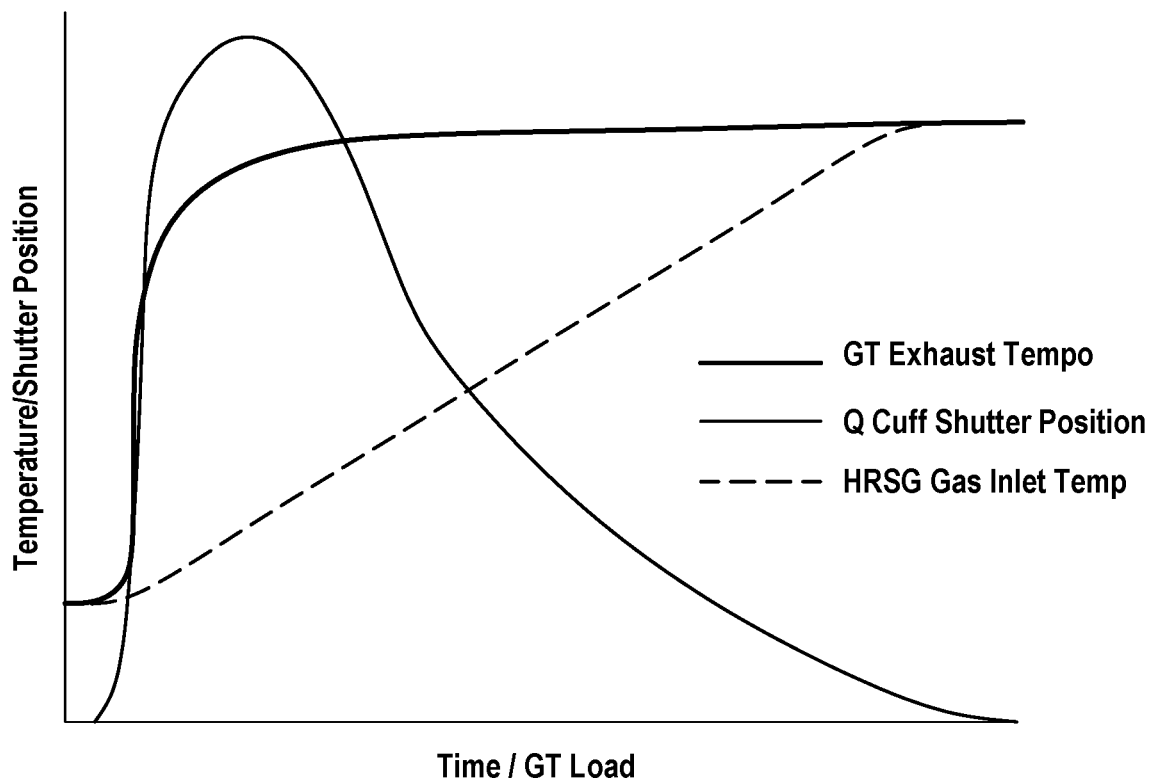
FIG. 7 illustrates simulated performance of the apparatus and method of the present invention according to one embodiment of the present invention.

FIG. 7 illustrates simulated performance of the apparatus and method of the present invention according to one embodiment of the present invention. The embodiment illustrated in FIG. 7 is the application of the present invention to a gas turbine exhaust gas stream that is fed to an HRSG, as shown, for example, in FIG. 6. Specifically, the embodiment illustrated in FIG. 7 is the application of the present invention to a gas turbine exhaust gas stream during a period of time, such as startup or a transient operation, in which the temperature of the exhaust gas stream ("GT Exhaust Temp") experiences a sudden and significant increase in a short period of time. Accordingly, in this embodiment, the apparatus of the present invention, such as that described above in connection with FIG. 1, would be part of the duct through which the gas turbine exhaust gas stream passes and be used to attemperate the temperature of the exhaust gas stream from the gas turbine prior to entering the HRSG.

In response to this sudden increase in temperature of the exhaust gas stream, the shutters on the apparatus of the present invention would open. The specific degree of openness over time is shown in FIG. 7 (Shutter Position). As illustrated, the shutters open almost concurrently with the rate of increase in the gas exhaust temperature and continue to open more fully as the exhaust gas stream temperature continues to increase. It should be appreciated that in this embodiment, the apparatus and method of the present invention is used to reduce the rate of increase of the exhaust gas stream temperature so that the rate of increase of the temperature of that gas stream as it leaves the apparatus of the present invention and enters, for example, an HRSG is reduced. So, although the HRSG will experience an inlet gas stream with an increasing temperature, the rate of increase of that temperature is reduce to be significantly less than the rate of increase of the temperature of the exhaust gas stream from the gas turbine upstream of the apparatus of the present invention. This effect is illustrated in FIG. 7 by the temperature of the gas stream entering the HRSG, which is downstream of the apparatus of the present invention and after use of that apparatus to attemperate the exhaust gas stream from the gas turbine. As shown, the increase of the gas temperature entering the HRSG (HRSG Gas Inlet Temp) does increase but at a much lower rate than that of the exhaust gas stream exiting the gas turbine. Accordingly, the stress to the HRSG and related components is minimized or reduced by reducing what would otherwise be a sudden and significant increase in the inlet gas temperature to the HRSG, which can cause significant stress on the HRSG and related components.

It should be appreciated that the designs of the present invention may also be used in connection with the process of purging a gas turbine system. For example, prior to firing a gas turbine, the gas turbine may be operated as a fan to purge the system, including the downstream ductwork and the HRSG of any accumulated combustible gases. Thereafter, the gas turbine can be fired and operated. The designs of the present invention could be used to increase the mass flow rate of the gas through the system during purging, which may result in a reduction in the amount of time required for purging.

Figure 8:
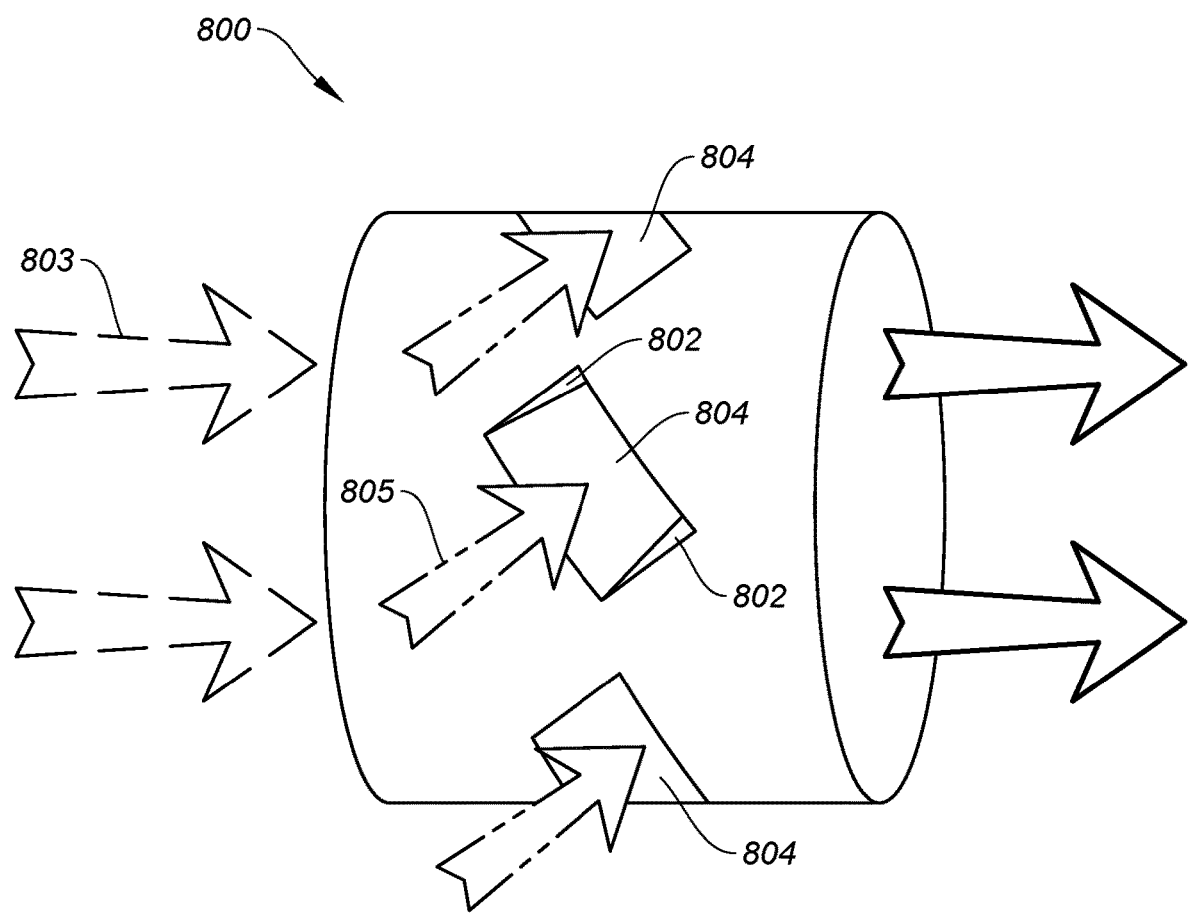
FIG. 8 illustrates a perspective side view of an apparatus for controlling a temperature of a gas stream according to another embodiment of the present invention.

FIG. 8 illustrates a perspective side view of an apparatus for controlling a temperature of a gas stream according to another embodiment of the present invention. The apparatus 800 is similar to that shown in FIG. 1 with the exception of the orientation of the openings and corresponding shutters. The openings 110 and corresponding shutters 112 in FIG. 1 during use would provide for the second gas passing through the openings and into the gas stream in the same direction of gas flow as the gas stream. Specifically, the opening of the shutters 112 along the upstream edge of the openings 110 that is essentially normal to the direction of gas flow through the apparatus 100 and inward into the gas duct would result in the shutters opening normal to the direction of gas flow through the apparatus 100. Therefore, the second gas would pass through the openings 110 in essentially the same direction of gas flow as the gas stream in the gas duct or passageway 108. FIG. 8 illustrates a plurality of openings 802 that are similar in shape to the openings 110 of FIG. 1 but having edges defining the openings 802 that are not parallel to the direction of gas flow 803 through the apparatus 800. In this case, the shutters 804 are attached to an edge of each opening 802 such that upon opening, the second gas 806 would pass through the opening 802 and into the gas stream in a direction other than the direction of gas flow of the gas stream 803 in the apparatus 800. In this manner, the second gas would create a spiral gas flow within the apparatus 800 or passageway within the apparatus. The overall impact of this spiral gas flow of the second gas upon entering the apparatus 800 on the total gas flow and its direction would be dependent upon amount of the second gas being added and its relative velocity/momentum. It should be appreciated that control over the introduction of the second gas using the orientation of the openings and the shutters can be used in conjunction with the control provided by the ability to independently control which shutters are opened and to what degree as described above.

Figure 9:
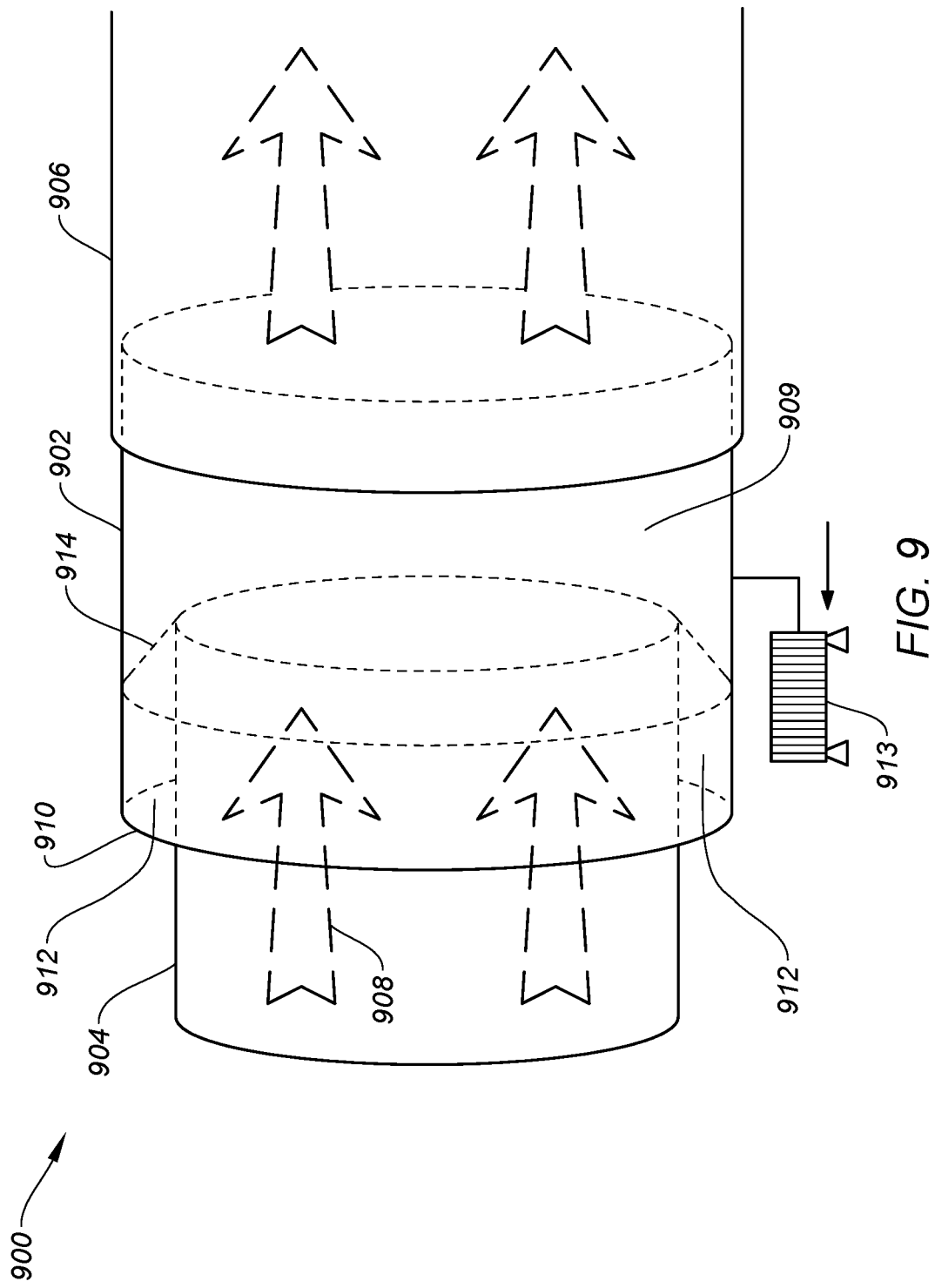
FIG. 9 illustrates a perspective side view of an apparatus for controlling a temperature of a gas stream according to another embodiment of the present invention.

FIG. 9 illustrates a perspective side view of an apparatus for controlling a temperature of a gas stream according to another embodiment of the present invention. As depicted, the apparatus 900 may be a sleeve 902 that connects two ends of two separate gas ducts 904, 906 such that a gas stream 908 (as shown by the arrows) may pass from the first or upstream gas duct 904 through a passageway or gas duct 909 defined by the sleeve 902 and into the second or downstream gas duct 906. In this embodiment, the sleeve 902 is disposed around the outside of the upstream gas duct 904 and overlaps that gas duct 904 by a given length as measured along the direction of gas flow through the gas duct 902. In particular, the upstream end 910 of the sleeve 902 is sized larger than the outer dimensions of the upstream gas duct 904 to thereby define or create a gap or opening 912 between the interior surface of the sleeve 902 and the outer surface of the upstream gas duct 904. It should be appreciated that the size of the gap or opening 912 can be designed based upon the sizing of the sleeve 902 about the upstream gas duct 904. The downstream end 911 of the sleeve 902 fits inside of the downstream gas duct 906, and a circumferential seal can be used to provide a gas seal between the downstream end 911 of the sleeve 902 and the downstream gas duct 906. It should be appreciated that impingement of hot gases directly upon the circumferential seal can be minimized or prevented by virtue of the sleeve 902 fitting inside of the downstream gas duct 906, which in turn reduces the potential for seal failure and gas leakage. In one embodiment, the circumferential seal between the interior surface of the downstream gas duct 906 and the exterior surface of the sleeve 902 is a high temperature flexible metallic gasket affixed around the entire exterior circumference of the sleeve 902 at or near the downstream end of the sleeve 902.

The sleeve 902 can slide back and forth along the direction of gas flow (as shown by the direction of the arrows representing the gas stream 908) or along the length of the gas ducts 904, 906 by a given amount. The movement of the sleeve 902 can be controlled using an actuator motor 913. When moved along the lengths of the gas ducts 904, 906 toward the upstream gas duct 904, the interior of the sleeve 902 creates a gas seal with the upstream gas duct 904 or seals against the surface of the upstream gas duct 904, thereby sealing the gap or opening 912 between the interior surface of the sleeve 902 and the outer surface of the upstream gas duct 904 and preventing a second gas, such as a gas from passing outside of the sleeve 902 or upstream gas duct 904 into the sleeve 902. This gas seal can be created by an interior funnel portion or collar 914 attached within the sleeve 902, such as to an inside surface of the sleeve 902, that traverses the gap or opening 912 and engages or seals against the end of the upstream gas duct 904 or its outer surface near the end of the gas duct 904 when the sleeve 902 is moved toward the upstream gas duct 904. Accordingly, as shown in FIG. 9, the apparatus 900 is illustrated in a closed position such that a gas seal has been created between the interior surface of the sleeve 902 and the outer surface of the upstream gas duct 904, which prevents gas from passing through the gap or opening 912 in either direction. It should be appreciated that the circumferential gas seal between the downstream end 911 of the sleeve 902 and the downstream gas duct 906 is maintained during use of the sleeve 902, including its sliding back and forth. Accordingly, the connection between the downstream end 911 of the sleeve 902 and the downstream gas duct 906 must provide for the ability for the sleeve 902 to move back and forth along the downstream gas duct 906 while maintaining the gas seal. The gas seal is maintained at this location to avoid the release of any gas from the gas stream at this point.

Figure 10:
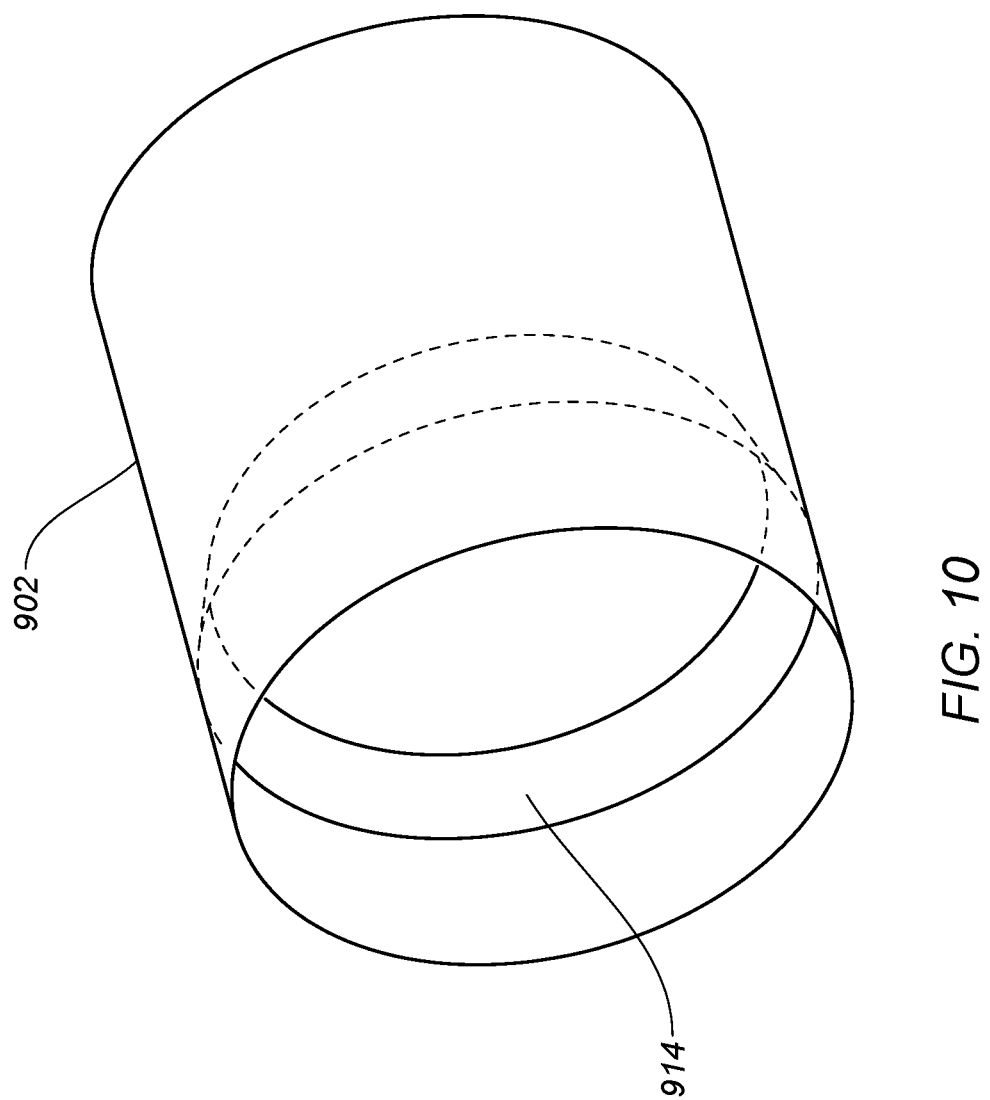
FIG. 10 illustrates a perspective end view of the apparatus for controlling a temperature of a gas stream of FIG. 9 according to one embodiment of the present invention.

FIG. 10 illustrates a perspective end view of an apparatus for controlling a temperature of a gas stream of FIG. 9 according to one embodiment of the present invention. As depicted, the sleeve 902 has a funnel portion or collar 914 that is positioned within the sleeve 902. The collar 914 is attached to the inside surface of the sleeve 902 and is angled or tapered away from that surface and inwardly toward the center of the sleeve 902. The terminal edge 1002 of the funnel portion or collar 914 mates with the outer surface of the upstream gas duct 904 to create a gas seal that prevents gas from passing through the gap 912 between the interior surface of the sleeve 902 and the outer surface of the upstream gas duct 904. It should be appreciated that the gas seal does not preclude the sleeve 902 from moving back and forth. In one embodiment, the terminal edge 1002 of the funnel portion or collar 914 may contain a flexible portion, such as a rubber gasket or similar part, that when engaged against the upstream gas duct, creates the gas seal at the edge of the upstream gas duct 904. It should be appreciated that other designs may be used to create the gas seal between the interior surface of the sleeve 902 and the outer surface of the upstream gas duct 904.

Figure 11:
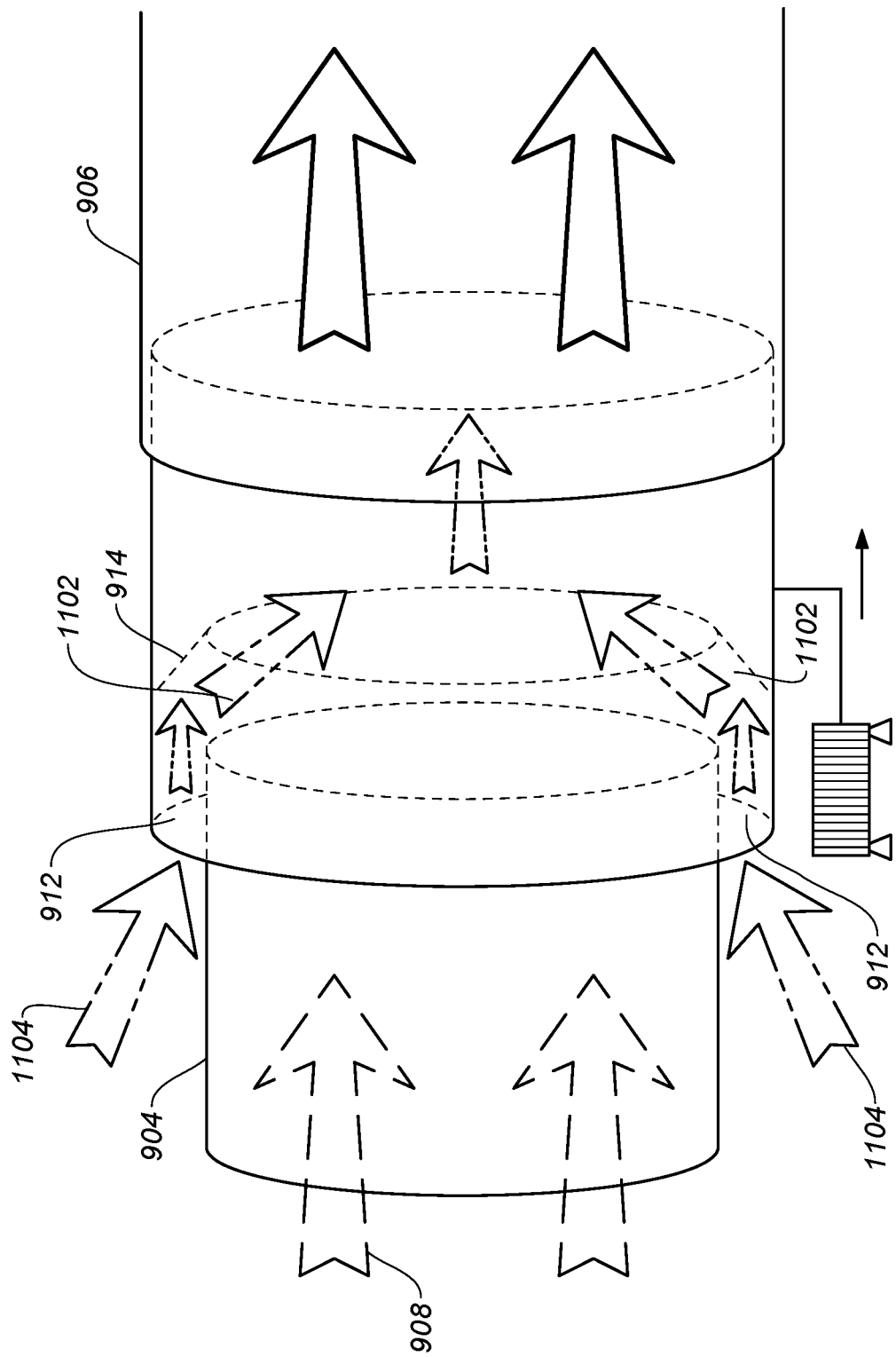
FIG. 11 illustrates a perspective side view of the apparatus of FIG. 9 in an open position according to one embodiment of the present invention.

FIG. 11 illustrates a perspective side view of the apparatus of FIG. 9 in an open position according to one embodiment of the present invention. As depicted, the sleeve 902 has been moved toward the downstream gas duct 906, thereby removing the gas seal between the upstream gas duct 904 and the funnel portion or collar 914 of the sleeve 902. Accordingly, the sleeve 902 is shown in an open position as the funnel or collar 914 is positioned away from or separated from the end of the upstream gas duct 904. In this case, the gas stream 908 simply passes through the opening 1102 of the funnel portion or collar 914. As the gas stream 908 passes through the passageway or duct 909 within the sleeve 902, the second gas 1104, such as gas located outside of the upstream gas duct 904 or ambient air, is pulled through the gap or opening 912 and into the gas stream 908 within the passageway within the sleeve 902. Based upon a temperature difference between the second gas stream 1102 and the gas stream 908 in the gas duct, the addition of this second gas 1102 to the gas stream 908 in the gas duct results in controlling the temperature of the gas stream 908 in the gas duct or controlling the rate of temperature change, such as a rapid increase in temperature, in the gas stream 908 in the gas duct. It should be appreciated that the sleeve 902 may be moved to any position between a fully open position and the closed position shown in FIG. 9. Positioning the sleeve 902 at a position between fully open and closed provides the ability to control the amount of gas flowing through the gap 912 due to the relative position of the funnel portion or collar 914 and the end of the upstream gas duct 904. In other words, as the collar 914 is moved closer to the end of the gas duct 904, the gap 912 will become more restricted thus permitting less gas to pass from outside of the upstream gas duct 904 through the gap 912 and into the gas stream 908 in the sleeve 902.

Again, it should be appreciated that regardless of the position of the sleeve 902, the circumferential gas seal with the downstream gas duct 906 is maintained. It should be appreciated that any means known in the art for creating a gas seal between the sleeve 902 and the downstream gas duct 906, while allowing the sleeve 902 to move back and forth along the downstream gas duct 906 may be used.

Figure 12:
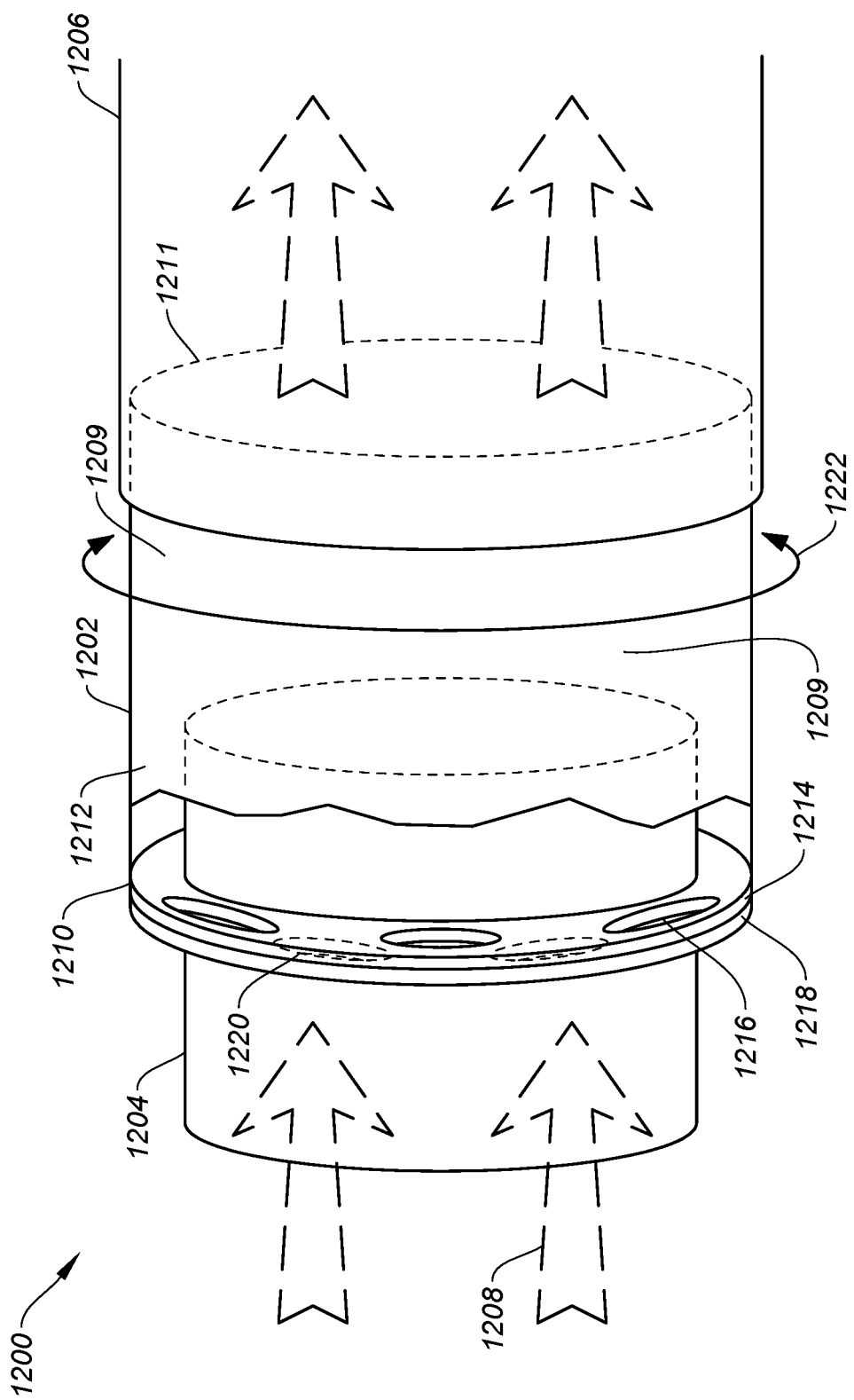
FIG. 12 illustrates a perspective side view of an apparatus for controlling a temperature of a gas stream according to another embodiment of the present invention.

FIG. 12 illustrates a perspective side view of an apparatus for controlling a temperature of a gas stream according to another embodiment of the present invention. As depicted, the apparatus 1200 may be a sleeve 1202 that connects two ends of two separate gas ducts 1204, 1206 such that a gas stream 1208 (as shown by the arrows) may pass from the first or upstream gas duct 1204 through a passageway or gas duct 1209 defined by the sleeve 1202 and into the second or downstream gas duct 1206. In this embodiment, the sleeve 1202 is disposed around the outside of the upstream gas duct 1204 and overlaps that gas duct 1204 by a given length as measured along the direction of gas flow through the gas duct 1202. In particular, the upstream end 1210 of the sleeve 1202 is sized larger than the outer dimensions of the upstream gas duct 1204 to define or create a gap or opening 1212 between the interior surface of the sleeve 1202 and the outer surface of the upstream gas duct 1204. The downstream end 1211 of the sleeve 1202 fits inside of the downstream gas duct 1206, and a circumferential seal can be used to provide a gas seal between the downstream end 1211 of the sleeve 1202 and the downstream gas duct 1206. It should be appreciated that impingement of hot gases directly upon the circumferential seal can be minimized or prevented by virtue of the sleeve 1202 fitting inside of the downstream gas duct 1206, which in turn reduces the potential for seal failure and gas leakage. In one embodiment, the circumferential seal between the interior surface of the downstream gas duct 1206 and the exterior surface of the sleeve 1202 is a high temperature flexible metallic gasket affixed around the entire exterior circumference of the sleeve 1202 at or near the downstream end of the sleeve 1202.

At the upstream end 1210 of the sleeve 1202, a plate 1214 having a plurality of openings or holes or ports 1216 is attached to the upstream end 1210 of the sleeve 1202 and extends from the sleeve 1202 inwardly toward the surface of the upstream gas duct 1204. The plate 1214 can be made from the same materials of construction as the sleeve 1202, and the openings 1216 can be any shape or size and there can be any desired number of openings 1216. As described below, a second gas to be added to the gas stream 1208 will pass through these openings 1216. Accordingly, in designing the openings 1216, including the cross-sectional area of each opening 1216 and the overall total cross-sectional area available for the second gas to pass through should be taken into account.

A similarly designed plate 1218 is attached to the outer surface of the upstream gas duct 1204 and has a set of openings or holes or ports 1220 that corresponds in size, shape, and number to the openings 1216 in the plate 1214 attached to the sleeve 1202. It should be appreciated that the plate 1218 attached to the outer surface of the upstream gas duct 1204 is attached such that it is stationary. The plate 1218 attached to the outer surface of the upstream gas duct 1204 extends outwardly such that it is parallel to the plate 1214 attached to the sleeve 1202. Further, the plate 1218 attached to the outer surface of the upstream gas duct 1204 is positioned along the upstream gas duct 1204 such that it is adjacent to the plate 1214 attached to the sleeve 1202. It should be appreciated that the plate 1218 attached to the outer surface of the upstream gas duct 1204 positioned such that it is on either side of the plate 1214 attached to the sleeve 1202.

As shown in FIG. 12, the openings 1216 in the plate 1214 attached to the sleeve 1202 are offset or misaligned relative to the openings 1220 in the plate 1218 attached to the outer surface of the upstream gas duct 1204. Accordingly, a second gas cannot pass through either set of openings 1216, 1220 in either plate 1214, 1218, effectively creating a gas seal and preventing gas from passing into or out of the gap 1212. In this position, the sleeve 1202 is in a closed position, and no second gas can be added to the gas stream 1208 passing through the sleeve 1202. It should be appreciated that when the openings are offset, adequate sealing of the openings can be accomplished by a similar high temperature metallic gasket material affixed around the circumference of each opening on the posterior surface to seal against the anterior surface.

In this embodiment, the sleeve 1202 can rotate around an axis defined by the longitudinal center of the passageway or gas duct 1209 created by the sleeve 1202. As depicted, the sleeve 1202 can rotate in both directions as shown by the arrow 1222 shown in FIG. 12. It should be appreciated that the sleeve 1202 can rotate to any position around this axis. The rotation of the sleeve 1202 can be controlled using an actuator motor (not shown). When rotated, the openings 1216 in the plate 1214 attached to the sleeve 1202 can be aligned with the openings 1220 in the plate 1218 attached to the outer surface of the upstream gas duct 1204. Accordingly, a second gas from outside of the upstream gas duct 1204 can then pass through the openings 1216, 1220 in both plates 1214, 1218, through the gap 1212, and into the gas stream 208 passing through the passageway provided by the sleeve 1202. It should be appreciated that since the sleeve 1202 can rotate to any position around its axis of rotation that the openings 1216, 1220 in both plates 1214, 1218 can be aligned such that the openings 1216, 1220 are completely open or partially open. For example, the sleeve 1202 can be rotated such that the openings 1216 in the plate 1214 attached to the sleeve 1202 partially obstruct the corresponding openings 1218 in the sleeve attached to the upstream gas duct 1204.

Figure 13:
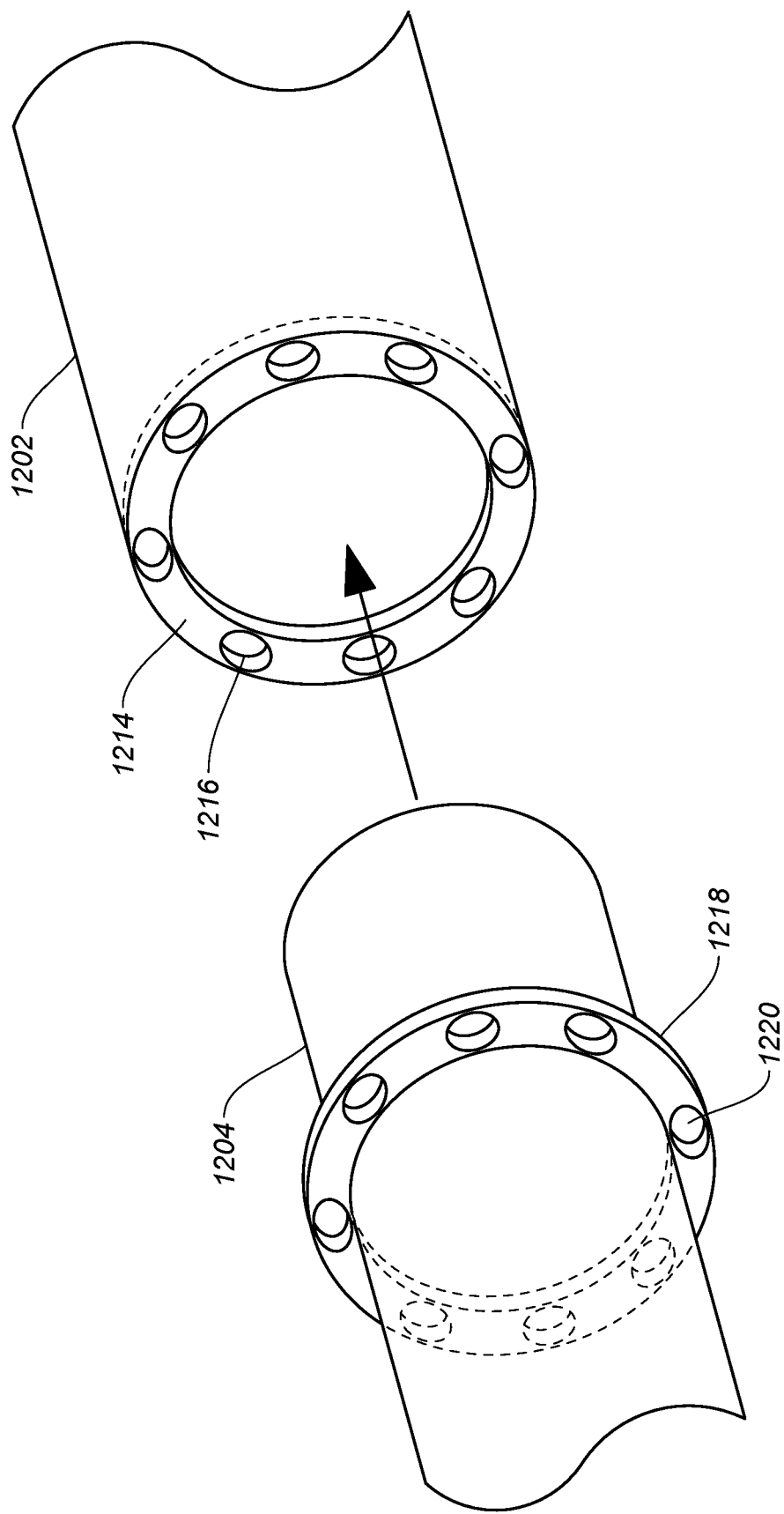
FIG. 13 is a perspective side view of the upstream gas duct and the sleeve of FIG. 12 separated from each other according to one embodiment of the present invention.

FIG. 13 is a perspective side view of the upstream gas duct and the sleeve of FIG. 12 separated from each other according to one embodiment of the present invention. As shown, the sleeve 1202 has a plate 1214 attached to either the end of the sleeve 1202 or to its interior surface near the end of the sleeve 1202. This plate 1214 is generally a flat plate that traverses the perimeter of the sleeve 1202. In this embodiment, the sleeve 1202 is a circular tube such that the plate 1214 is also circular. The plate 1214 has the plurality of openings 1216.

Also as shown, the upstream gas duct 1204 has a plate 1218 that is similarly shaped and sized to the plate 1214 attached to the sleeve 1202. The plate 1218 attached to the upstream gas duct 1204 has a similarly number of openings 1220 that are similarly sized to the openings 1216 in the plate 1214 attached to the sleeve 1202. The plate 1218 is positioned a given length from the end of the upstream gas duct 1204 such that when the sleeve 1202 is positioned over this end of the upstream gas duct 1204, a portion of the upstream gas duct will extend within the sleeve 1202 to the point that the plate 1218 is adjacent to the plate 1214 attached to the sleeve 1202. As described, as the sleeve 1202 is rotated, the degree of rotation can be used to determine the extent to which the openings 1216, 1220 in both plates 1214, 1218 are aligned.

Figure 14:
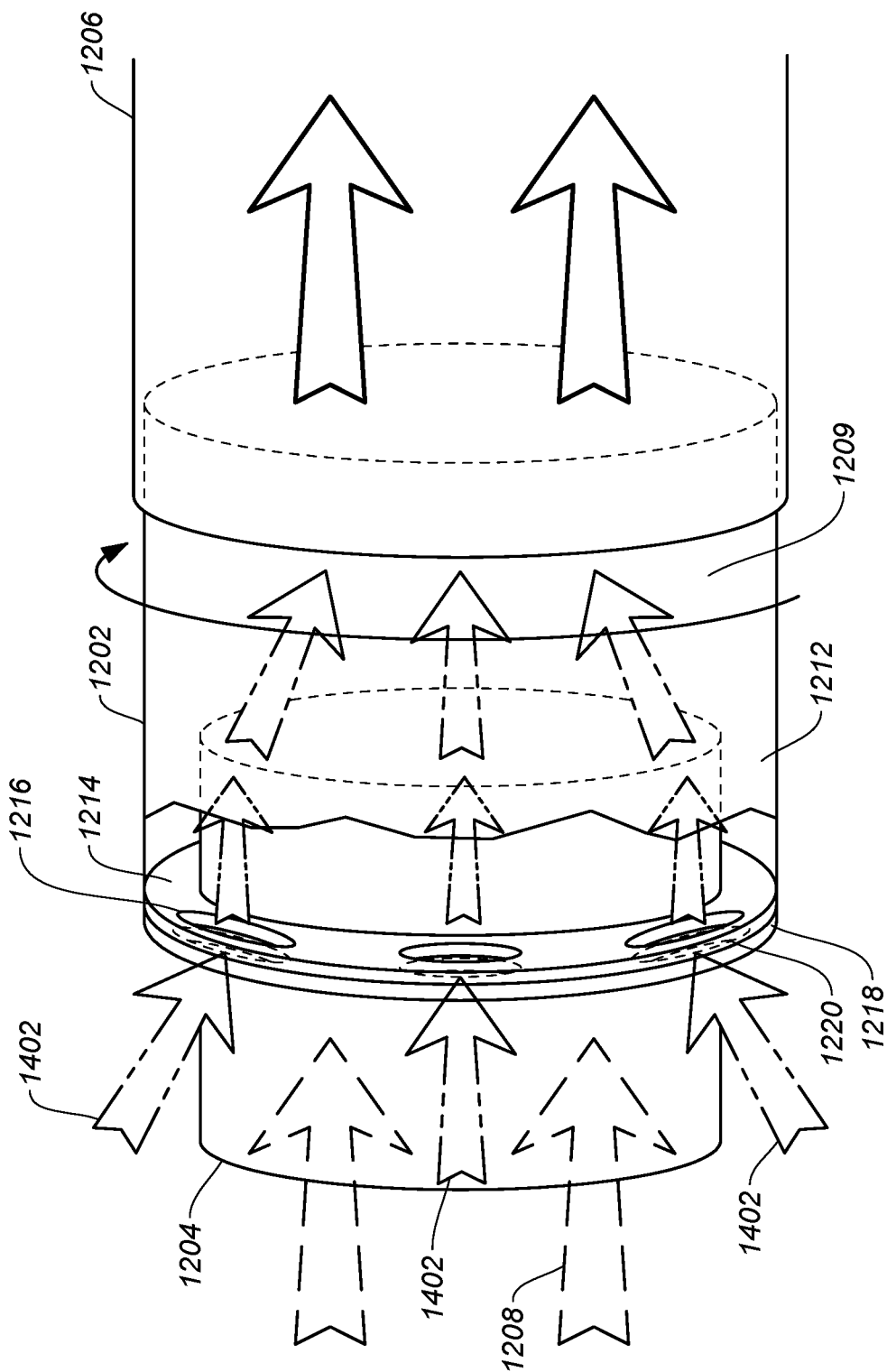
FIG. 14 illustrates a perspective side view of the apparatus of FIG. 12 in an open position according to another embodiment of the present invention.

FIG. 14 illustrates a perspective side view of the apparatus of FIG. 12 in an open position according to another embodiment of the present invention. As depicted, the sleeve 1202 has been rotated such that the openings 1216, 1220 in both plates 1214, 1218 are aligned and permit the full flow of a second gas 1402 to pass from outside of the upstream gas duct 1204, through the openings 1216, 1220 in both plates 1214, 1218, through the gap 1212 between the interior surface of the sleeve 1202 and that portion of the outer surface of the upstream gas duct 1204 within the sleeve 1202, and into the gas stream 1208 passing through the passageway 1209 provided by the sleeve 1202.

Based upon a temperature difference between the second gas stream 1402 and the gas stream 1208 in the gas duct, the addition of this second gas 1402 to the gas stream 1208 in the gas duct results in controlling the temperature of the gas stream 1208 in the gas duct or controlling the rate of temperature change, such as a rapid increase in temperature, in the gas stream 1208 in the gas duct. It should be appreciated that the sleeve 1202 may be rotated to any position between a fully open position at which the openings 1216, 1220 in both plates 1214, 1218 are fully aligned and completely open as shown in FIG. 14 and the closed position at which the openings 1216, 1220 in both plates 1214, 1218 are offset or not aligned and prevent the passing of any gas through the corresponding plates 1214, 1218 and into the gas stream 1208 within the passageway 1209 of the sleeve 1202 as shown in FIG. 12. Positioning the sleeve 1202 at a position between fully open and closed provides the ability to control the amount of gas flowing through the gap 1212. In other words, as the openings 1216, 1220 become more aligned more gas can pass from outside of the upstream gas duct 1204 through the gap 1212 and into the gas stream 1208 in the sleeve 1202.

It should be appreciated that the circumferential gas seal between the downstream end 1211 of the sleeve 1202 and the downstream gas duct 1206 is maintained during use of the sleeve 1202, including during its rotation to any position. Accordingly, the connection between the downstream end 1211 of the sleeve 1202 and the downstream gas duct 1206 must provide for the ability for the sleeve 1202 to rotate while maintaining the gas seal. The gas seal is maintained at this location to avoid the release of any gas from the gas stream at this point.

It should be appreciated that the various designs of the apparatus of the present invention as shown in FIGS. 9-14 may also be used as described and shown in connection with FIGS. 4-6. Although the apparatus of FIG. 1 was referred to regarding FIG. 4-6, the apparatus of FIG. 1 could be replaced with the apparatuses of FIGS. 9-14, noting that references to operating the shutters of the apparatus of FIG. 1 would instead refer to operation of the sleeves of FIGS. 9-14, including sliding the sleeve or rotating the sleeve as applicable.

Figure 15:
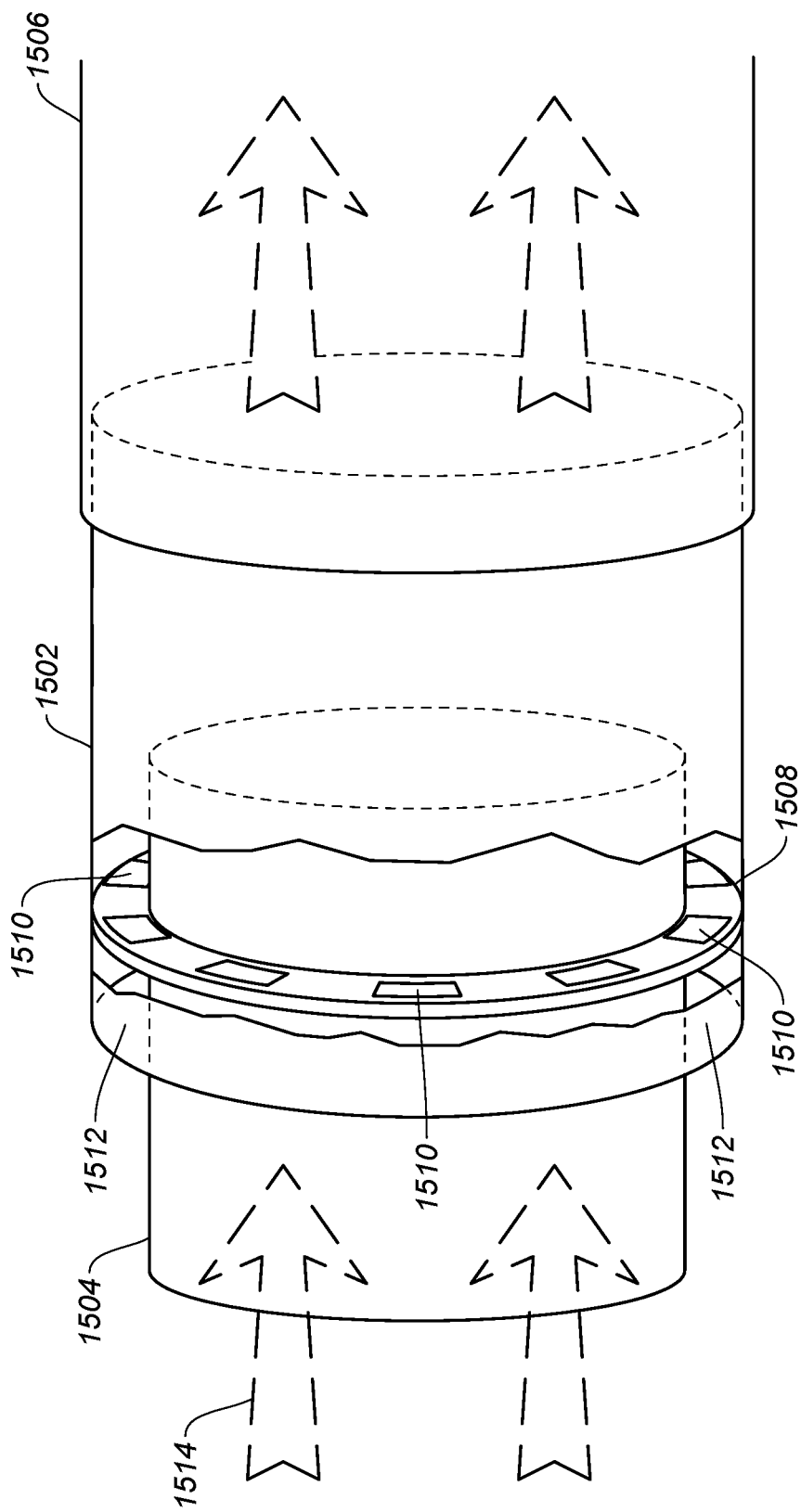
FIG. 15 illustrates a perspective side view of an apparatus for controlling a temperature of a gas stream according to another embodiment of the present invention.

FIG. 15 illustrates a perspective side view of an apparatus for controlling a temperature of a gas stream according to another embodiment of the present invention. The embodiment depicted in FIG. 15 is a sleeve similar to those described in connection with FIGS. 9 and 12 with the exception that in this embodiment the sleeve is stationary. This embodiment is also similar to the sleeve described in connection with FIG. 12 in that a plate having a plurality of openings is attached to the inside surface of the sleeve and traverse the gap or opening between the sleeve and the outer surface of the upstream gas duct. However, in this embodiment, a corresponding plurality of shutters are attached to plate and control the passage of a second gas from outside of the gas duct into the sleeve and the main gas stream.

As depicted, the apparatus is a sleeve 1502 that connects two ends of two separate gas ducts 1504, 1506 such that a gas stream 1514 (as shown by the arrows) may pass from the first or upstream gas duct 1504 through a passageway or gas duct defined by the sleeve 1502 and into the second or downstream gas duct 1506. In this embodiment, the sleeve 1502 is disposed around the outside of the upstream gas duct 1504 and overlaps that gas duct 1504 by a given length as measured along the direction of gas flow 1514 through the gas duct 1502. In particular, the upstream end of the sleeve 1502 is sized larger than the outer dimensions of the upstream gas duct 1504 to thereby define or create a gap or opening 1512 between the interior surface of the sleeve 1502 and the outer surface of the upstream gas duct 1504. It should be appreciated that the size of the gap or opening 1512 can be designed based upon the sizing of the sleeve 1502 about the upstream gas duct 1504. The downstream end of the sleeve 1502 fits inside of the downstream gas duct 1506, and a circumferential seal can be used to provide a gas seal between the downstream end of the sleeve 1502 and the downstream gas duct 1506. It should be appreciated that impingement of hot gases directly upon the circumferential seal can be minimized or prevented by virtue of the sleeve 1502 fitting inside of the downstream gas duct 1506, which in turn reduces the potential for seal failure and gas leakage. In one embodiment, the circumferential seal between the interior surface of the downstream gas duct 1506 and the exterior surface of the sleeve 1502 is a high temperature flexible metallic gasket affixed around the entire exterior circumference of the sleeve 1502 at or near the downstream end of the sleeve 1502.

At the upstream end of the sleeve 1502, a plate 1508 is attached to the upstream end of the sleeve 1502 and extends from the sleeve 1502 inwardly toward the surface of the upstream gas duct 1504. The plate has a plurality of shutters 1510 that cover a corresponding plurality of openings or holes or ports. The shutters 1510 may be designed and operated as described above in connection with FIGS. 1-5 and 8, including the ability to independently control each shutter 1510. As shown, the shutters 1510 are currently in a closed position in that they are covering the corresponding plurality of openings and preventing the passage of gas from outside of the gas duct 1504, such as ambient air, into the sleeve 1502 and the gas stream 1514.

Figure 16:
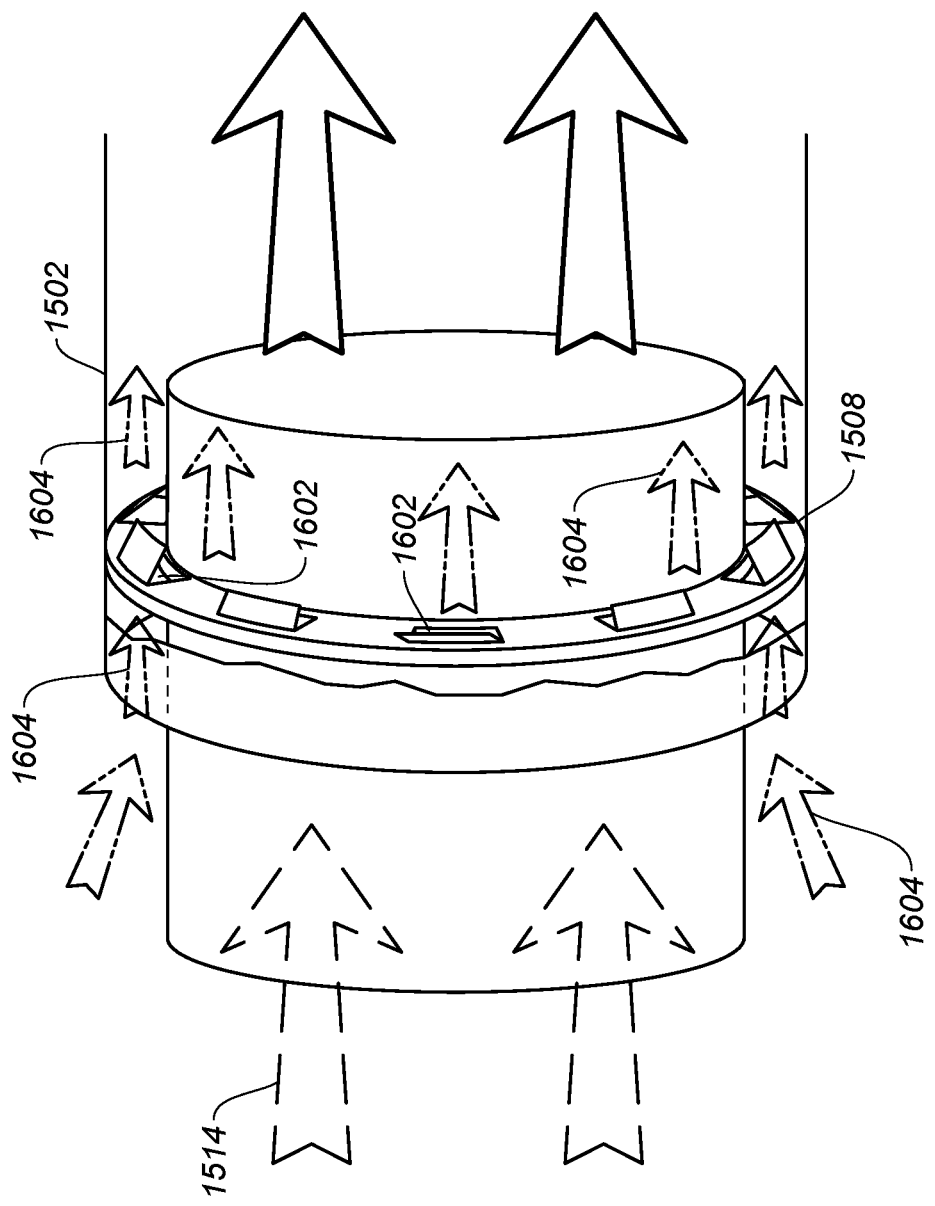
FIG. 16 illustrates a perspective side view of the apparatus of FIG. 15 in an open position according to another embodiment of the present invention.

FIG. 16 illustrates a perspective side view of the apparatus of FIG. 15 in an open position according to another embodiment of the present invention. As depicted, the shutters 1510 are shown in an open position such that the corresponding openings 1602 are visible. In this position, a second gas 1604 can pass through the gap or opening 1512, through the openings 1602 in the plate 1508, and into the main gas stream 1514.

Various embodiments of the invention have been described above. However, it should be appreciated that alternative embodiments are possible and that the invention is not limited to the specific embodiments described above. For examples, while the invention has been described in the context of a gas turbine and attemperation of the exhaust gas stream from the gas turbine prior to entering a HRSG, the invention may be used in other industrial gas streams where it is desirable to either control a gas stream temperature or reduce a rate of increase of a gas stream temperature. It should be appreciated that, in at least some of the embodiments of the invention, such as the embodiment depicted in FIG. 1, the apparatus does not comprise, and need not comprise, any fans, sprays, dampers, bypass systems, or similar structures. Therefore, the apparatus permits temperature control of a gas stream, including an exhaust gas stream from a combustion turbine, in a relatively straightforward manner, without the need to install complex and potentially expensive auxiliary cooling systems, such as fan systems. It should further be appreciated that the apparatus is capable of attachment directly to a metal pipe through which a gas stream flows, including, but not limited to, a gas exhaust pipe of a combustion turbine. Attachment may be achieved through mechanisms familiar to one of skill in the art, including, but not limited to, screws, nuts, bolts, and the like. Therefore, the apparatus is compatible with existing industrial structures, including pipe structures and pipe networks, without the need for specialized attachment mechanisms.

What is claimed is:

1. An apparatus for controlling a temperature of a gas stream, comprising:
   a first body having a first end and a second end and defining a passageway for passing a first gas stream from said first end to said second end and that separates the first gas stream from a different second gas outside of said passageway, wherein said first body defines a plurality of openings through which the second gas can pass into said passageway, wherein the second gas has a temperature that is different from a temperature of the first gas stream, wherein said first end is configured for attachment to a first gas duct to receive the first gas stream into said passageway at said first end, and wherein said second end is configured for attachment to a second gas duct to which the first gas stream passes after passing through said passageway; and
   at least one second body disposed adjacent to said first body, wherein said first body and said at least one second body cooperate to open said plurality of openings to allow the second gas to pass through said plurality of openings and to close said plurality of openings to prevent the second gas from passing through said plurality of openings;
   wherein said first body comprises a first collar attached to an inside surface of said first body that defines said plurality of openings; wherein said at least one second body comprises a second collar disposed adjacent to said first collar that defines a second plurality of openings, each one of said second plurality of openings corresponding to one of said plurality of openings defined by said first collar; and
   wherein said first body is configured to rotate to a plurality of positions.

\* \* \* \* \*